United States Patent
Omuro et al.

(10) Patent No.: US 11,472,399 B2
(45) Date of Patent: Oct. 18, 2022

(54) CONTROLLER AND CONTROL METHOD FOR HYBRID VEHICLE

(71) Applicant: TOYOTA JIDOSHA KABUSHIKI KAISHA, Toyota (JP)

(72) Inventors: Keisuke Omuro, Toyota (JP); Atsushi Tabata, Okazaki (JP); Tetsuya Kono, Okazaki (JP); Koichi Okuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 225 days.

(21) Appl. No.: 16/924,399

(22) Filed: Jul. 9, 2020

(65) Prior Publication Data
US 2021/0101583 A1    Apr. 8, 2021

(30) Foreign Application Priority Data
Oct. 2, 2019    (JP) .............................. JP2019-182544

(51) Int. Cl.
*B60W 10/26*    (2006.01)
*B60W 20/30*    (2016.01)
(Continued)

(52) U.S. Cl.
CPC ............ *B60W 20/30* (2013.01); *B60W 10/06* (2013.01); *B60W 10/08* (2013.01); *B60W 10/10* (2013.01);
(Continued)

(58) Field of Classification Search
CPC ...... B60W 30/19; B60W 20/13; B60W 10/30; B60W 10/06; B60W 10/08; B60W 10/10;
(Continued)

(56) References Cited

U.S. PATENT DOCUMENTS 5,205,191 A * 4/1993 Takata .................. B60W 10/11
                                                                477/33
6,880,337 B2    4/2005 Masuda
(Continued)

FOREIGN PATENT DOCUMENTS

JP    2009-208599 A    9/2009
JP    2010-036705 A    2/2010
(Continued)

OTHER PUBLICATIONS

U.S. Appl. No. 16/920,934, filed Jul. 6, 2020.
U.S. Office Action issued in U.S. Appl. No. 16/920,934 dated Jun. 17, 2022, citing documents 2-11 & 14-17 therein.

*Primary Examiner* — Roger L Pang
(74) *Attorney, Agent, or Firm* — Oblon, McClelland, Maier & Neustadt, L.L.P.

(57) ABSTRACT

A controller for a hybrid vehicle predicts whether necessary discharging electric power from a power storage device which is required to perform downshift in a transmission exceeds upper-limit discharging electric power of the power storage device when downshift in the transmission is performed in a hybrid vehicle travel mode and controls a compressor rotation speed such that a rate of increase of the compressor rotation speed of a supercharger at the time of performing downshift in the transmission increases as the upper-limit discharging electric power decreases when it is predicted that the necessary discharging electric power exceeds the upper-limit discharging electric power.

8 Claims, 8 Drawing Sheets

(51) Int. Cl.
  *B60W 10/06* (2006.01)
  *B60W 10/08* (2006.01)
  *B60W 10/10* (2012.01)
  *F02B 39/10* (2006.01)
  *B60W 30/19* (2012.01)

(52) U.S. Cl.
  CPC ............ *B60W 10/26* (2013.01); *B60W 30/19* (2013.01); *F02B 39/10* (2013.01); *B60W 2510/244* (2013.01); *B60W 2510/246* (2013.01); *B60W 2510/248* (2013.01)

(58) Field of Classification Search
  CPC ........... B60W 10/26; B60W 2510/244; B60W 2510/0246; B60W 2710/0638; B60W 2510/248; F02D 23/00; F02B 39/10
  USPC ........................................................ 477/107
  See application file for complete search history.

(56) References Cited

U.S. PATENT DOCUMENTS

| | | |
|---|---|---|
| 10,190,485 B2 | 1/2019 | Yamane |
| 10,344,668 B2 | 7/2019 | Benjey et al. |
| 10,590,836 B2 | 3/2020 | McConville et al. |
| 10,895,197 B2 | 1/2021 | Buckland et al. |
| 2009/0227409 A1 | 9/2009 | Ito et al. |
| 2014/0208745 A1 | 7/2014 | Suhocki et al. |
| 2015/0336566 A1* | 11/2015 | Johri .................. F02N 11/0862 290/31 |
| 2019/0003408 A1 | 1/2019 | Hata et al. |
| 2020/0240330 A1 | 7/2020 | Christensen et al. |
| 2021/0086752 A1* | 3/2021 | Tabata ................. B60W 20/30 |
| 2021/0101583 A1 | 4/2021 | Omuro et al. |

FOREIGN PATENT DOCUMENTS

| | | | |
|---|---|---|---|
| JP | 2010270836 A | * 12/2010 | |
| JP | 2014-144659 A | 8/2014 | |
| JP | 2015-214184 A | 12/2015 | |
| JP | 2016-203833 A | 12/2016 | |
| WO | WO-2014027505 A1 | * 2/2014 | ........... B60W 10/06 |

* cited by examiner

| AT GEAR STAGE | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |
| Rev | ○ | | | ○ | |

CONTROLLER AND CONTROL METHOD FOR HYBRID VEHICLE

CROSS-REFERENCE TO RELATED APPLICATION

This application claims priority to Japanese Patent Application No. 2019-182544 filed on Oct. 2, 2019, incorporated herein by reference in its entirety.

BACKGROUND

1. Technical Field

The disclosure relates to a controller and a control method for a hybrid vehicle including an engine with a supercharger and a rotary machine as drive power sources for travel and including a transmission in a power transmission path between the engine and driving wheels and between the rotary machine and the driving wheels.

2. Description of Related Art

A controller for a hybrid vehicle including an engine with a supercharger, a rotary machine, and a power storage device that transmits and receives electric power to and from the rotary machine, using power which is output from the engine and the rotary machine as drive power for travel, and including a transmission in a power transmission path between the engine driving wheels and between the rotary machine and the driving wheels is known. An example thereof is a controller for a hybrid vehicle which is described in Japanese Unexamined Patent Application Publication No. 2015-214184 (JP 2015-214184 A).

SUMMARY

When a power storage device is subjected to a discharge limitation using upper-limit discharge electric power, necessary discharging electric power from the power storage device which is required for performing a downshift in a transmission may exceed the upper-limit discharging electric power. JP 2015-214184 A discloses that when necessary discharging electric power is predicted to exceed upper-limit discharging electric power at the time of performing a downshift in a transmission, a time required for progress of a downshift is adjusted based on a predicted electric power excess. However, in the controller described in JP 2015-214184 A, since the time required for progress of a downshift extends as the predicted electric power excess increases, deterioration in gear shift responsiveness may be caused.

The disclosure provides a controller and a control method for a hybrid vehicle that can prevent necessary discharging electric power required when a downshift in a transmission is performed from exceeding upper-limit discharging electric power and curb deterioration in gear shift responsiveness.

According to a first aspect of the disclosure, there is provided a controller for a hybrid vehicle including an engine with a supercharger serving as a drive power source for travel, a rotary machine serving as a drive power source for travel, a power storage device configured to transmit and receive electric power to and from the rotary machine, and a transmission that is provided in a power transmission path between the engine and driving wheels and between the rotary machine and the driving wheels. The controller includes a prediction unit and a control unit. The prediction unit is configured to predict whether necessary discharging electric power from the power storage device which is required to perform downshift in the transmission exceeds upper-limit discharging electric power of the power storage device when downshift in the transmission is performed in a hybrid vehicle travel mode (hereinafter referred to as an HV travel mode). The control unit is configured to control a compressor rotation speed such that a rate of increase of the compressor rotation speed of the supercharger at the time of performing downshift in the transmission increases as the upper-limit discharging electric power decreases when it is predicted that the necessary discharging electric power exceeds the upper-limit discharging electric power.

The controller for a hybrid vehicle according to the first aspect of the disclosure includes the prediction unit that predicts whether the necessary discharging electric power from the power storage device which is required to perform downshift in the transmission exceeds the upper-limit discharging electric power of the power storage device when downshift in the transmission is performed in the HV travel mode and the control unit that controls the compressor rotation speed such that a rate of increase of the compressor rotation speed of the supercharger at the time of performing downshift in the transmission increases as the upper-limit discharging electric power decreases when it is predicted that the necessary discharging electric power exceeds the upper-limit discharging electric power. When downshift in the transmission is performed, as the upper-limit discharging electric power of the power storage device decreases, the rate of increase of the compressor rotation speed of the supercharger increases, a response delay of the supercharging pressure decreases, and a rate of increase of an engine torque increases. Accordingly, it is possible to curb an amount of assist torque of the rotary machine which is required to increase an input rotation speed of the transmission and to decrease the necessary discharging electric power from the power storage device to the rotary machine. As a result, it is possible to prevent the necessary discharging electric power from the power storage device which is required when downshift in the transmission is performed from exceeding the upper-limit discharging electric power of the power storage device and to curb deterioration in gear shifting responsiveness.

In the controller for a hybrid vehicle according to the first aspect, the control unit may be configured to control the compressor rotation speed such that the rate of increase of the compressor rotation speed increases as a target supercharging pressure increases.

In the controller for a hybrid vehicle having this configuration, the control unit further controls the compressor rotation speed such that the rate of increase of the compressor rotation speed increases as the target supercharging pressure increases. As the target supercharging pressure increases, the rate of increase of the compressor rotation speed of the supercharger increases and the supercharging pressure increases more rapidly. When downshift in the transmission is performed, as the target supercharging pressure increases, the rate of increase of the compressor rotation speed increases, the rate of increase of the supercharging pressure becomes more suitable, and the response delay of the supercharging pressure decreases. Accordingly, it is possible to prevent the necessary discharging electric power from the power storage device which is required when downshift in the transmission is performed from exceeding the upper-limit discharging electric power of the power storage device and to curb deterioration in gear shifting responsiveness.

In the controller for a hybrid vehicle according to the first aspect, the prediction unit may be configured to estimate the necessary discharging electric power using a map in which a relationship between a type of combination of gear stages before and after performing the downshift in the transmission and the necessary discharging electric power is determined in advance.

In the controller for a hybrid vehicle having this configuration, the prediction unit estimates the necessary discharging electric power using the map in which the relationship between a type of combination of gear stages before and after performing the downshift in the transmission and the necessary discharging electric power is determined in advance. By using the map in this way, it is possible to estimate the necessary discharging electric power before performing the downshift.

In the controller for a hybrid vehicle according to the first aspect, the supercharger may include at least an electric supercharger and the compressor rotation speed of the supercharger may be a rotation speed of an electric compressor included in the electric supercharger.

In the controller for a hybrid vehicle having this configuration, the supercharger includes at least an electric supercharger and the compressor rotation speed of the supercharger is set as the rotation speed of the electric compressor of the supercharger. Accordingly, for example, by controlling the rotation speed of the electric motor which is connected to the electric compressor, the rotation speed of the electric compressor which is the compressor rotation speed of the supercharger is controlled.

In the controller for a hybrid vehicle according to the first aspect, the upper-limit discharging electric power may be configured to be determined based on a temperature and a state of charge value of the power storage device.

In the controller for a hybrid vehicle having this configuration, the upper-limit discharging electric power is determined based on the temperature and the state of charge value of the power storage device. Accordingly, it is possible to curb progress of deterioration of the power storage device and to determine the upper-limit discharging electric power according to necessity for charging of the power storage device.

In the controller for a hybrid vehicle according to the first aspect, the upper-limit discharging electric power may be configured to be determined to decrease as a degree of deterioration of the power storage device increases.

In the controller for a hybrid vehicle having this configuration, the upper-limit discharging electric power is determined to decrease as the degree of deterioration of the power storage device increases. By determining the upper-limit discharging electric power of the power storage device to decrease as the degree of deterioration of the power storage device increases in this way, it is possible to limit a charging/discharging current of the power storage device and thus to curb progress of deterioration of the power storage device.

In the controller for a hybrid vehicle according to the first aspect, when the upper-limit discharging electric power is limited to be less than a predetermined determination electric power value, the control unit may be configured to control the compressor rotation speed such that the rate of increase of the compressor rotation speed of the supercharger at the time of performing downshift in the transmission increases as the upper-limit discharging electric power decreases.

In the controller for a hybrid vehicle having this configuration, when the upper-limit discharging electric power is limited to be less than the predetermined determination electric power value, the control unit controls the compressor rotation speed such that the rate of increase of the compressor rotation speed of the supercharger at the time of performing downshift in the transmission increases as the upper-limit discharging electric power decreases. This is because there is a likelihood that the necessary discharging electric power will exceed the upper-limit discharging electric power when the upper-limit discharging electric power is limited.

According to a second aspect of the disclosure, there is provided a control method for a hybrid vehicle including an engine with a supercharger serving as a drive power source for travel, a rotary machine serving as a drive power source for travel, a power storage device configured to transmit and receive electric power to and from the rotary machine, and a transmission that is provided in a power transmission path between the engine and driving wheels and between the rotary machine and the driving wheels. The control method includes: predicting whether necessary discharging electric power from the power storage device which is required to perform downshift in the transmission exceeds upper-limit discharging electric power of the power storage device when downshift in the transmission is performed in a hybrid vehicle travel mode; and controlling a compressor rotation speed such that a rate of increase of the compressor rotation speed of the supercharger at the time of performing downshift in the transmission increases as the upper-limit discharging electric power decreases when it is predicted that the necessary discharging electric power exceeds the upper-limit discharging electric power.

With the control method for a hybrid vehicle according to the second aspect, when downshift in the transmission is performed, as the upper-limit discharging electric power of the power storage device decreases, the rate of increase of the compressor rotation speed of the supercharger increases, the response delay of the supercharging pressure decreases, and the rate of increase of the engine torque increases. Accordingly, it is possible to curb an amount of assist torque of the rotary machine which is required to increase an input rotation speed of the transmission and to decrease the necessary discharging electric power from the power storage device to the rotary machine. As a result, it is possible to prevent the necessary discharging electric power from the power storage device which is required when downshift in the transmission is performed from exceeding the upper-limit discharging electric power of the power storage device and to curb deterioration in gear shifting responsiveness.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described in detail with reference to the accompanying drawings. In the following embodiments, the drawings are appropriately simplified or modified, and dimensional ratios, shapes, and the like of constituent elements are not necessarily illustrated accurately.

Figure 1:
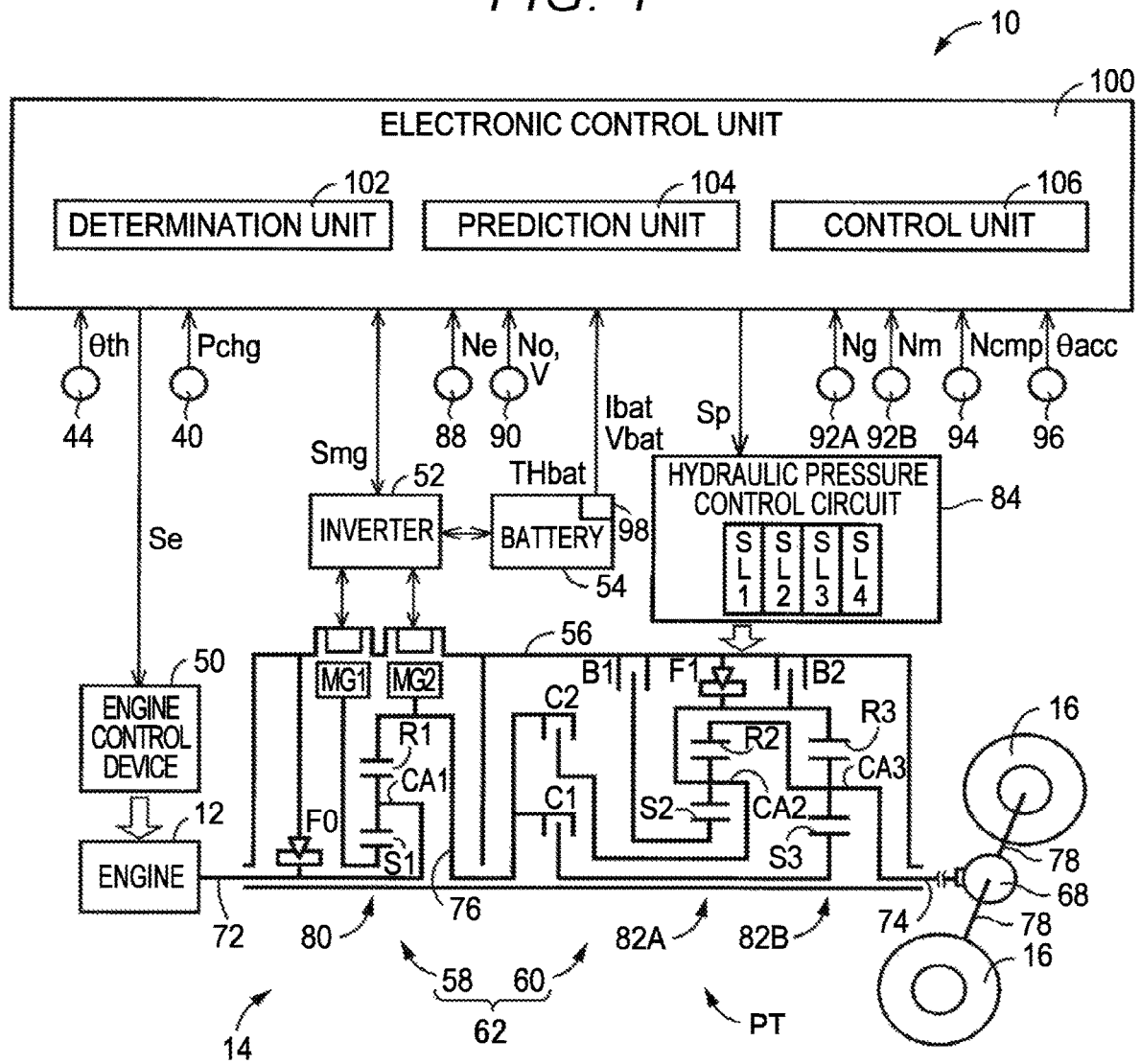
FIG. 1 is a functional block diagram schematically illustrating a configuration of a vehicle in which an electronic control unit according to a first embodiment of the disclosure is mounted and illustrating principal parts of a control function for various types of control in the vehicle.

FIG. 1 is a diagram schematically illustrating a configuration of a hybrid vehicle 10 in which an electronic control unit 100 according to a first embodiment of the disclosure is mounted and illustrating a principal part of a control function for various types of control in the hybrid vehicle 10. The hybrid vehicle 10 (hereinafter referred to as a "vehicle 10") includes an engine 12, a first rotary machine MG1, a second rotary machine MG2, a power transmission device 14, and driving wheels 16.

Figure 2:
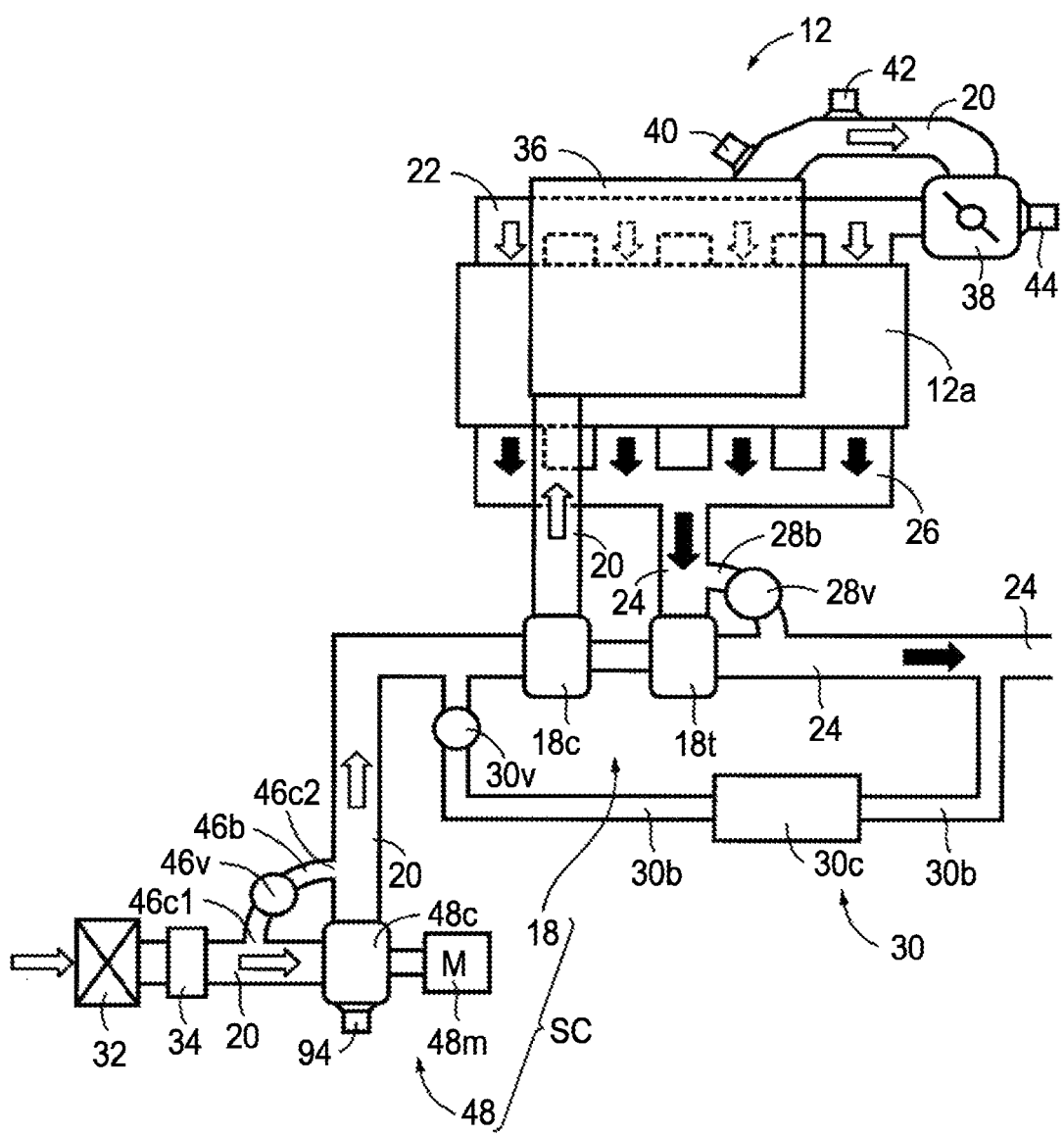
FIG. 2 is a diagram schematically illustrating a configuration of an engine illustrated in FIG. 1.

FIG. 2 is a diagram schematically illustrating a configuration of the engine 12. The engine 12 is a power source for travel of the vehicle 10 and is a known internal combustion engine such as a gasoline engine or a diesel engine including a supercharger SC, that is, an engine with the supercharger SC. The supercharger SC includes an exhaust turbine type supercharger 18 and an electric supercharger 48. An intake pipe 20 is provided in an intake system of the engine 12, and the intake pipe 20 is connected to an intake manifold 22 which is attached to an engine body 12a. An exhaust pipe 24 is provided in an exhaust system of the engine 12 and the exhaust pipe 24 is connected to an exhaust manifold 26 which is attached to the engine body 12a.

The exhaust turbine type supercharger 18 is a known exhaust-turbine supercharger including a compressor 18c that is provided in the intake pipe 20 and a turbine 18t that is provided in the exhaust pipe 24. The turbine 18t is rotationally driven by exhaust gas, that is, a flow of exhaust gas. The compressor 18c is connected to the turbine 18t and is rotationally driven by the turbine 18t to compress air suctioned to the engine 12, that is, intake air.

The electric supercharger 48 includes an electric compressor 48c that is provided in the intake pipe 20 upstream from the compressor 18c and an electric motor 48m that is connected to the electric compressor 48c, and electrically performs supercharging. The electric compressor 48c is rotationally driven by the electric motor 48m to compress intake air of the engine 12. The electric motor 48m is controlled by an electronic control unit 100 which will be described later such that the electric compressor 48c is rotationally driven. The electric supercharger 48 is driven, for example, such that a response delay of supercharging by the exhaust turbine type supercharger 18 is complemented.

An exhaust bypass 28b that causes exhaust gas to flow from upstream to downstream with respect to the turbine 18t by bypassing the turbine 18t is provided in the exhaust pipe 24. A waste gate valve 28v (hereinafter referred to as "WGV 28v") that continuously controls a ratio of exhaust gas passing through the exhaust bypass 28b to exhaust gas passing through the turbine 18t is provided in the exhaust bypass 28b. A valve opening of the WGV 28v is continuously adjusted by causing the electronic control unit 100 which will be described later to operate an actuator which is not illustrated. As the valve opening of the WGV 28v increases, exhaust gas of the engine 12 is more likely to be discharged via the exhaust bypass 28b. Accordingly, in a supercharged state of the engine 12 in which a supercharging operation of the exhaust turbine type supercharger 18 works, a supercharging pressure Pchg [Pa] from the supercharger SC decreases as the valve opening of the WGV 28v increases. The supercharging pressure Pchg is a pressure of intake air and is an air pressure downstream from the compressor 18c in the intake pipe 20. A side on which the supercharging pressure Pchg is low is, for example, a side with a pressure of intake air in a non-supercharged state of the engine 12 in which the supercharging operation of the supercharger SC does not work at all, that is, a side with a pressure of intake air in an engine with out the supercharger SC.

An air cleaner 32 is provided in an inlet of the intake pipe 20, and an air flowmeter 34 that measures an amount of intake air Qair of the engine 12 is provided in the intake pipe 20 downstream from the air cleaner 32 and upstream from the electric compressor 48c. An intercooler 36 which is a heat exchanger that cools intake air compressed by the supercharger SC by exchanging heat between intake air and outside air or a coolant is provided in the intake pipe 20 downstream from the compressor 18c. An electronic throttle valve 38 of which opening and closing are controlled by causing the electronic control unit 100 which will be described later to operate a throttle actuator which is not illustrated is provided in the intake pipe 20 downstream from the intercooler 36 and upstream from the intake manifold 22. A supercharging pressure sensor 40 that detects the supercharging pressure Pchg and an intake air temperature sensor 42 that detects an intake air temperature THair [° C.] which is the temperature of intake air are provided in the intake pipe 20 between the intercooler 36 and the electronic throttle valve 38. A throttle valve opening sensor 44 that detects a throttle valve opening θth [%] which is an opening of the electronic throttle valve 38 is provided in the vicinity of the electronic throttle valve 38, for example, in the throttle actuator.

An intake bypass 46b that causes intake air to flow from upstream to downstream with respect to the electric compressor 48c by bypassing the electric compressor 48c is provided in the intake pipe 20. The intake bypass 46b is connected to the intake pipe 20 upstream from the electric compressor 48c at a connection part 46c1 and is connected to the intake pipe 20 downstream from the electric compressor 48c at a connection part 46c2. An air bypass valve 46v that opens and closes a passage of the intake bypass 46b between a fully open state and a fully closed state is provided in the intake bypass 46b. Opening and closing of the air bypass valve 46v are controlled by causing the electronic control unit 100 which will be described later to operate an actuator which is not illustrated. For example, the air bypass valve 46v is opened such that the electric supercharger 48 is less likely to serve as resistance against the intake air flowing through the intake pipe 20 at the time of non-operation of the electric supercharger 48.

A low-pressure EGR device 30 that causes some exhaust gas with a relatively low pressure flowing in the exhaust pipe 24 downstream from the turbine 18t to recirculate to the intake pipe 20 is provided. The low-pressure EGR device 30 includes an EGR bypass 30b, an EGR valve 30v, and an EGR cooler 30c. The EGR bypass 30b connects the intake pipe 20 between the connection part 46c2 and the compressor 18c to the exhaust pipe 24 downstream from the turbine 18t and guides some exhaust gas from the exhaust pipe 24 downstream from the turbine 18t to the intake pipe 20 between the connection part 46c2 and the compressor 18c. Here, exhaust gas that recirculates via the EGR bypass 30b is referred to as "EGR gas." The EGR valve 30v adjusts an amount of EGR gas by changing a passage sectional-area of the EGR bypass 30b. The EGR cooler 30c decreases the temperature of the EGR gas by exchange of heat between the EGR gas passing through the EGR cooler 30c and a coolant. A valve opening of the EGR valve 30v is controlled by the electronic control unit 100, for example, such that a ratio of the EGR gas to a preset amount of intake air Qair is achieved according to an operating state of the engine 12 (for example, an engine rotation speed Ne [rpm] and an engine load).

In the engine 12, an engine torque Te [Nm] which is output from the engine 12 is controlled by causing the electronic control unit 100 which will be described later to control an engine control device 50 (see FIG. 1) including the electronic throttle valve 38, a fuel injection device, an ignition device, the WGV 28v, the electric motor 48m, and the air bypass valve 46v.

Referring back to FIG. 1, the first rotary machine MG1 and the second rotary machine MG2 are rotary electric machines having a function of an electric motor (a motor) and a function of a power generator (a generator) and are so-called motor generators. The first rotary machine MG1 and the second rotary machine MG2 can serve as drive power sources for travel of the vehicle 10. The first rotary machine MG1 and the second rotary machine MG2 are connected to a battery 54 which is provided in the vehicle 10 via an inverter 52 which is provided in the vehicle 10. In the first rotary machine MG1 and the second rotary machine MG2, an MG1 torque Tg [Nm] which is output from the first rotary machine MG1 and an MG2 torque Tm [Nm] which is output from the second rotary machine MG2 are controlled by causing the electronic control unit 100 which will be described later to control the inverter 52. For example, in the case of forward rotation, a torque which is output from a rotary machine is a powering torque at a positive torque which is an acceleration side and is a regenerative torque at a negative torque which is a deceleration side. When the MG1 torque Tg and the MG2 torque Tm which are output from the first rotary machine MG1 and the second rotary machine MG2 are powering torques, power which is output from the first rotary machine MG1 and the second rotary machine MG2 is drive power for travel. The battery 54 transmits and receives electric power to and from the first rotary machine MG1 and the second rotary machine MG2. The battery 54 is a chargeable/dischargeable secondary battery such as a lithium-ion battery pack or a nickel-hydride battery pack. The first rotary machine MG1 and the second rotary machine MG2 are provided in a case 56 which is a non-rotary member attached to the vehicle body. The battery 54 is an example of a "power storage device" in the claims.

The power transmission device 14 includes an electrical stepless gear shifting unit 58 and a mechanical stepped gear shifting unit 60 which are disposed in series on a common axis in a case 56 serving as a non-rotary member attached to the vehicle body. The stepless gear shifting unit 58 is connected to the engine 12 directly or indirectly via a damper or the like which is not illustrated. The stepped gear shifting unit 60 is connected to an output side of the stepless gear shifting unit 58. The power transmission device 14 includes a differential gear 68 that is connected to an output shaft 74 which is an output rotary member of the stepped gear shifting unit 60 and a pair of axles 78 that is connected to the differential gear 68. In the power transmission device 14, power which is output from the engine 12 or the second rotary machine MG2 is transmitted to the stepped gear shifting unit 60. The power transmitted to the stepped gear shifting unit 60 is transmitted to the driving wheels 16 via the differential gear 68 or the like. The stepped gear shifting unit 60 is provided in a power transmission path PT which will be described later between the engine 12 and the driving wheels 16 and between the second rotary machine MG2 and the driving wheels 16. The stepped gear shifting unit 60 is an example of a "transmission" in the claims.

The power transmission device 14 having this configuration is suitably used for a vehicle of a front-engine rear-drive (FR) type. The stepless gear shifting unit 58, the stepped gear shifting unit 60, or the like is disposed to be substantially symmetric with respect to the common axis, and a lower half with respect to the axis is not illustrated in FIG. 1. The common axis is an axis of a crankshaft of the engine 12, an input shaft 72 connected to the crankshaft, or the like. The intermediate transmission member 76, the stepped gear shifting unit 60, the differential gear 68, and the axles 78 of the power transmission device 14 constitute the power transmission path PT which is provided between the engine 12 and the driving wheels 16 and between the second rotary machine MG2 and the driving wheels 16.

The stepless gear shifting unit 58 includes a differential mechanism 80 which is a power split mechanism that mechanically splits power of the engine 12 to the first rotary machine MG1 and the intermediate transmission member 76 which is an output rotary member of the stepless gear shifting unit 58. The first rotary machine MG1 is a rotary machine to which the power of the engine 12 is transmitted. The second rotary machine MG2 is connected to the intermediate transmission member 76 in a power-transmittable manner. Since the intermediate transmission member 76 is connected to the driving wheels 16 via the stepped gear shifting unit 60, the second rotary machine MG2 is connected to the power transmission path PT in a power-transmittable manner and the second rotary machine MG2 is a rotary machine that is connected to the driving wheels 16 in a power-transmittable manner. The differential mechanism 80 is a differential mechanism that splits and transmits the power of the engine 12 to the driving wheels 16 and the first rotary machine MG1. The stepless gear shifting unit 58 is an electrical stepless transmission in which a differential state of the differential mechanism 80 (that is, a differential state of the stepless gear shifting unit 58) is controlled by controlling the operating state of the first rotary machine MG1 which is connected to the differential mechanism 80 in a power-transmittable manner. The first rotary machine MG1 is a rotary machine that can control an engine rotation speed Ne. The engine rotation speed Ne is a rotation speed of the engine 12.

The differential mechanism 80 is a known single-pinion type planetary gear device including a sun gear S1, a carrier CA1, and a ring gear R1.

The stepped gear shifting unit 60 is a mechanical gear shifting mechanism serving as a stepped transmission constituting a part of the power transmission path PT between the intermediate transmission member 76 and the driving wheels 16, that is, an automatic transmission constituting a part of the power transmission path PT between the differential mechanism 80 and the driving wheels 16. The intermediate transmission member 76 also serves as an input rotary member of the stepped gear shifting unit 60.

The stepped gear shifting unit 60 is, for example, a known planetary gear type automatic transmission including a plurality of planetary gear units such as a first planetary gear unit 82A and a second planetary gear unit 82B and a plurality of engagement devices such as a clutch C1, a clutch C2, a brake B1, a brake B2, and a one-way clutch F1. In the following description, the clutch C1, the clutch C2, the brake B1, and the brake B2 are simply referred to as engagement devices CB when not particularly distinguished from each other.

Each engagement device CB is a hydraulic frictional engagement device which is constituted by a multi-disc or single-disc clutch or brake which is pressed by a hydraulic actuator, a band brake which is tightened by a hydraulic actuator, and the like. In each engagement device CB, an engagement torque which is a torque capacity of each engagement device CB is changed according to adjusted hydraulic pressures which are output from solenoid valves SL1 to SL4 in a hydraulic pressure control circuit 84 by causing the electronic control unit 100 which will be described later to control the hydraulic pressure control circuit 84 provided in the vehicle 10. Accordingly, the operating state such as an engaged state or a disengaged state of each engagement device CB is switched.

The first planetary gear unit 82A is a known single-pinion type planetary gear unit that includes a sun gear S2, a carrier CA2, and a ring gear R2. The second planetary gear unit 82B is a known single-pinion type planetary gear unit that includes a sun gear S3, a carrier CA3, and a ring gear R3.

The differential mechanism 80, the first planetary gear unit 82A, the second planetary gear unit 82B, the engagement devices CB, the one-way clutch F1, the first rotary machine MG1, and the second rotary machine MG2 are connected as illustrated in FIG. 1. In the differential mechanism 80, the carrier CA1 serves as an input element, the sun gear S1 serves as a reaction element, and the ring gear R1 serves as an output element.

In the stepped gear shifting unit 60, a certain gear stage out of a plurality of gear shifting stages with different gear ratios γat (=AT input rotation speed Nati [rpm]/AT output rotation speed Nato [rpm]) is formed, by switching a combination of the operating states of the plurality of engagement devices CB. In the first embodiment, a gear stage which is formed in the stepped gear shifting unit 60 is referred to as an AT gear stage. The AT input rotation speed Nati is an input rotation speed of the stepped gear shifting unit 60 and has the same value as the rotation speed of the intermediate transmission member 76 and the same value as an MG2 rotation speed Nm [rpm]. The AT output rotation speed Nato is a rotation speed of the output shaft 74 which is an output rotary member of the stepped gear shifting unit 60 and is also an output rotation speed No [rpm] of a composite transmission 62 which is a combined transmission including the stepless gear shifting unit 58 and the stepped gear shifting unit 60.

Figure 3:
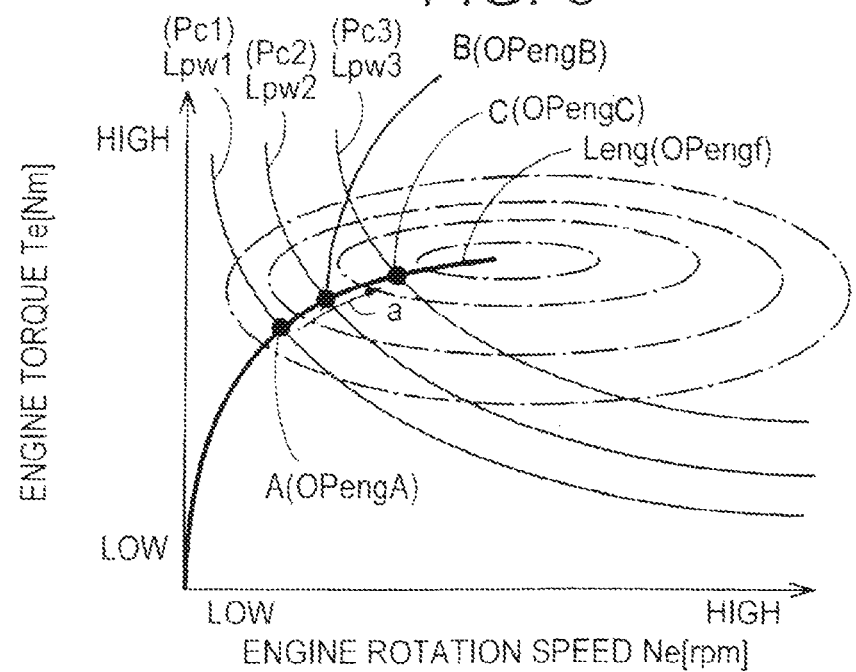
FIG. 3 is a diagram illustrating an example of an optimal engine operating point in a two-dimensional coordinate system with an engine rotation speed and an engine torque of the engine as variables.

FIG. 3 is a diagram illustrating an example of optimal engine operating points OPengf in a two-dimensional coordinate system with the engine rotation speed Ne and the engine torque Te as variables. In FIG. 3, a maximum efficiency line Leng denotes a group of optimal engine operating points OPengf when the engine 12 operates. An optimal engine operating point OPengf is predetermined as an engine operating point OPeng at which total fuel efficiency in the vehicle 10 is the best in consideration of charging/discharging efficiency in the battery 54 in addition to fuel efficiency of the engine 12 alone, for example, when required engine power Pedem [W] is realized. That is, the engine rotation speed Ne at an optimal engine operating point OPengf is an optimal fuel-efficiency rotation speed Neeff at which the engine 12 can most efficiently output the required engine power Pedem.

Equi-engine-power lines Lpw1, Lpw2, and Lpw3 denote examples in which the required engine power Pedem is engine power Pe1, Pe2, and Pe3, respectively. A point A is an engine operating point OPengA when the engine power Pe1 is realized at the optimal engine operating point OPengf, a point B is an engine operating point OPengB when the engine power Pe2 is realized at the optimal engine operating point OPengf, and a point C is an engine operating point OPengC when the engine power Pe3 is realized at the optimal engine operating point OPengf. The points A, B, and C are also target values of the engine operating point OPeng which is expressed by a target engine rotation speed Netgt [rpm] and a target engine torque Tetgt [Nm], that is, a target engine operating point OPengtgt. That is, the target engine rotation speed Netgt is a target value of the engine rotation speed Ne and the target engine power Tetgt is a target value of the engine torque Te. Engine power Pe [W] is power which is output from the engine 12 and is drive power for travel which is output from the engine 12.

For example, when the target engine operating point OPengtgt changes from the point A to the point C with an increase in an accelerator opening θacc [%] (for example, an increase in an accelerator opening based on an increase in a depression amount of an accelerator pedal, which is not illustrated, by a driver), the engine operating point OPeng changes on a path a which passes over the maximum efficiency line Leng.

Although not illustrated in FIG. 3, the optimal engine operating points OPengf at which the fuel efficiency is the highest in the engine 12 with the supercharge SC are stored in advance with a supercharging pressure Pchg in addition to the engine rotation speed Ne and the engine torque Te as variables. The supercharging pressure Pchg when the required engine power Pedem is realized at the optimal engine operating point OPengf is a target supercharging pressure Pchgtgt [Pa].

Figure 4:
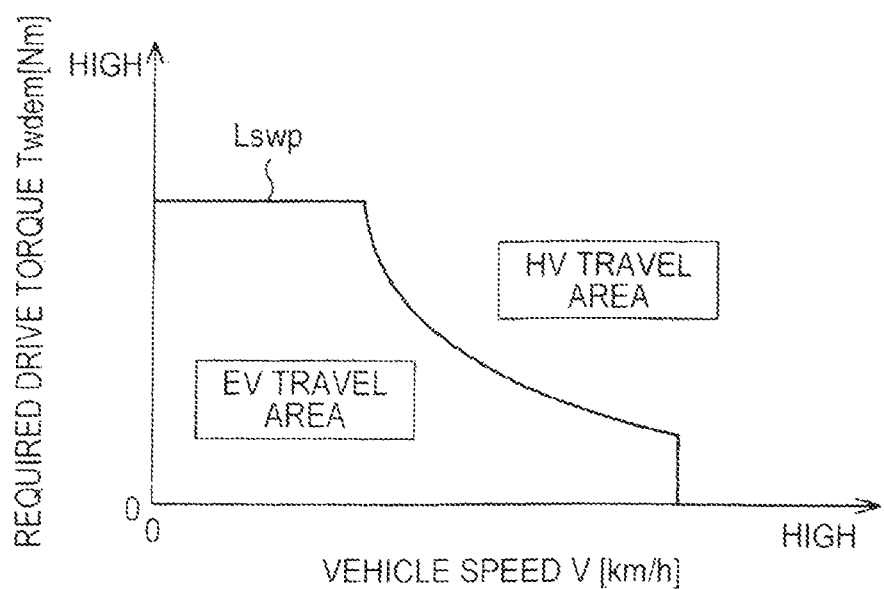
FIG. 4 is a diagram illustrating an example of a power source switching map which is used for switching control between electric-vehicle travel (hereinafter referred to as EV travel) and hybrid-vehicle travel (hereinafter referred to as HV travel) of the vehicle.

FIG. 4 is a diagram illustrating an example of a power source switching map which is used for switching control between EV travel and HV travel. In FIG. 4, a solid line Lswp is a boundary line between an EV travel area and an HV travel area at which switching between the EV travel and the HV travel is performed. An area in which a vehicle speed V [km/h] is relatively low and a required drive torque Twdem [Nm] is relatively low (that is, required drive power Pwdem [N] is relatively small) is defined in advance in the EV travel area. An area in which the vehicle speed V is relatively high and the required drive torque Twdem is relatively high (that is, the required drive power Pwdem is relatively great) is defined in advance in the HV travel area. When an SOC value SOC [%] of the battery 54 which will be described later is less than a predetermined state value or when warming-up of the engine 12 is necessary, the EV travel area in FIG. 4 may be changed to the HV travel area. The predetermined state value is a predetermined threshold value for determining that the state of charge value SOC is a value at which the engine 12 needs to be forcibly started to charge the battery 54.

The first rotary machine MG1 and the second rotary machine MG2 are connected to the battery 54 provided in the vehicle 10 via an inverter 52 which is provided in the vehicle 10. The MG1 torque Tg of the first rotary machine MG1 and the MG2 torque Tm of the second rotary machine MG2 are controlled by causing the electronic control unit 100 which will be described later to control the inverter 52.

Figures 5, 6:
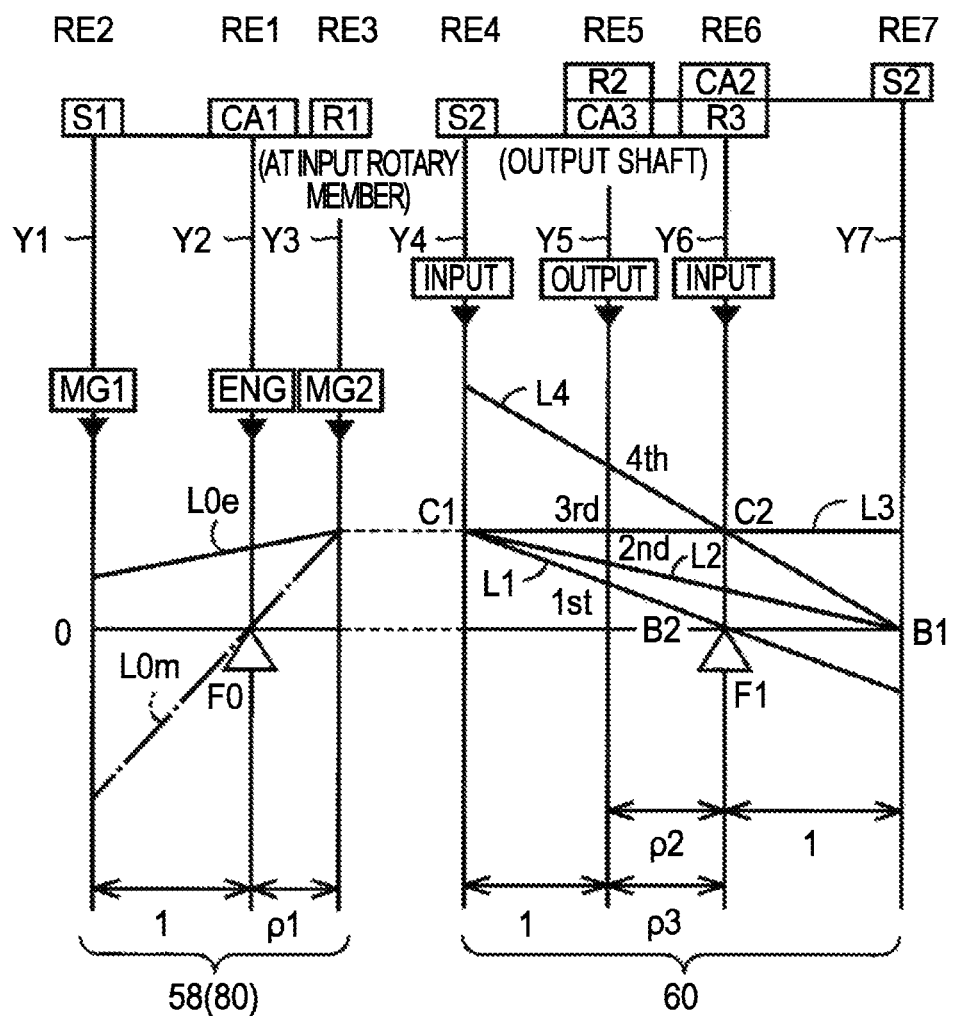
FIG. 5 is an engagement operation table illustrating a relationship between a gear shifting operation of a stepped gear shifting unit illustrated in FIG. 1 and a combination of operating states of engagement devices which are used therein.
FIG. 6 is a collinear diagram illustrating a relative relationship between rotation speeds of rotary elements in a stepless gear shifting unit and a stepped gear shifting unit illustrated in FIG. 1.

FIG. 5 is an engagement operation table illustrating a relationship between a gear shifting operation of the stepped gear shifting unit 60 illustrated in FIG. 1 and a combination of operating states of the engagement devices CB which are used therein In the stepped gear shifting unit 60, for example, four AT gear stages for forward movement including a first AT gear stage ("1st" in FIG. 5) to a fourth AT gear stage ("4th" in FIG. 5) are formed as a plurality of AT gear stages. The gear ratio γat of the first AT gear stage is the highest and the gear ratio γat becomes lower in a higher AT gear stage. An AT gear stage for reverse movement ("Rev" in FIG. 5) is formed, for example, by engagement of the clutch C1 and engagement of the brake B2. In FIG. 5, "○" denotes engagement, "Δ" denotes engagement at the time of engine braking or at the time of coast downshift of the stepped gear shifting unit 60, and a blank denotes disengagement. A coast downshift is, for example, a downshift which is performed in a decelerating travel state with an accelerator turned off out of downshifts which are performed due to a decrease in the vehicle speed V during decelerating travel with the accelerator turned off (the accelerator opening θacc is 0 or substantially 0). Downshift is synonymous with down gear shifting and upshift is synonymous with up gear shifting.

In the stepped gear shifting unit 60, for example, an AT gear stage which is formed according to the accelerator opening θacc which is an amount of operation of an accelerator by a driver, the vehicle speed V, or the like is switched, that is, a plurality of AT gear stages is selectively formed, by the electronic control unit 100 which will be described later. For example, in gear shifting control of the stepped gear shifting unit 60, so-called clutch-to-clutch gear shifting in which gear shifting is performed by switching one of the engagement devices CB, that is, gear shifting is performed by switching of the engagement devices CB between engagement and disengagement, is performed.

The vehicle 10 additionally includes a one-way clutch F0 (see FIG. 1). The one-way clutch F0 is a lock mechanism that can fix the carrier CA1 to be non-rotatable. That is, the one-way clutch F0 is a lock mechanism that can fix an input shaft 72 which is connected to the crankshaft of the engine 12 and which rotates integrally with the carrier CA1 to the case 56. In the one-way clutch F0, one member of two members that are rotatable relative to each other is integrally connected to the input shaft 72 and the other member is integrally connected to the case 56. The one-way clutch F0 idles in a positive rotating direction which is a rotating direction at the time of operation of the engine 12 and is automatically engaged in a negative rotating direction which is opposite to that at the time of operation of the engine 12. Accordingly, when the one-way clutch F0 idles, the engine 12 is rotatable relative to the case 56. On the other hand, when the one-way clutch F0 is engaged, the engine 12 is not rotatable relative to the case 56. That is, the engine 12 is fixed to the case 56 by engagement of the one-way clutch F0. In this way, the one-way clutch F0 permits rotation in the positive rotating direction of the carrier CA1 which is a rotating direction at the time of operation of the engine 12 and prohibits rotation in the negative rotating direction of the carrier CA1. That is, the one-way clutch F0 is a lock mechanism that can permit rotation in the positive rotating direction of the engine 12 and prohibit rotation in the negative rotating direction of the engine 12.

FIG. 6 is a collinear diagram illustrating a relative relationship between rotation speeds of the rotary elements in the stepless gear shifting unit 58 and the stepped gear shifting unit 60 which are illustrated in FIG. 1. In FIG. 6, three vertical lines Y1, Y2, and Y3 corresponding to three rotary elements of the differential mechanism 80 constituting the stepless gear shifting unit 58 are axes indicating the rotation speed of the sun gear S1 corresponding to a second rotary element RE2, the rotation speed of the carrier CA1 corresponding to a first rotary element RE1, and the rotation speed of the ring gear R1 (that is, the input rotation speed Nati of the stepped gear shifting unit 60) corresponding to a third rotary element RE3, respectively, sequentially from the left. Four vertical lines Y4, Y5, Y6, and Y7 of the stepped gear shifting unit 60 are axes indicating the rotation speed of the sun gear S3 corresponding to a fourth rotary element RE4, the rotation speed of the ring gear R2 and the carrier CA3 (that is, the rotation speed of the output shaft 74) connected to each other and corresponding to a fifth rotary element RE5, the rotation speed of the carrier CA2 and the ring gear R3 connected to each other and corresponding to a sixth rotary element RE6, and the rotation speed of the sun gear S2 corresponding to a seventh rotary element RE7, respectively, sequentially from the left. The gaps between the vertical lines Y1, Y2, and Y3 are determined according to a gear ratio ρ1 of the differential mechanism 80 (=number of teeth of the sun gear S1/number of teeth of the ring gear R1). The gaps between the vertical lines Y4, Y5, Y6, and Y7 are determined according to gear ratios ρ2 (=number of teeth of the sun gear S2/number of teeth of the ring gear R2) and ρ3 (=number of teeth of the sun gear S3/number of teeth of the ring gear R3) of the first planetary gear unit 82A and the second planetary gear unit 82B.

Referring to the collinear diagram illustrated in FIG. 6, in the differential mechanism 80 of the stepless gear shifting unit 58, the engine 12 (see "ENG" in FIG. 6) is connected to the first rotary element RE1, the first rotary machine MG1 (see "MG1" in FIG. 6) is connected to the second rotary element RE2, the second rotary machine MG2 (see "MG2" in FIG. 6) is connected to the third rotary element RE3 which rotates integrally with the intermediate transmission member 76, and rotation of the engine 12 is transmitted to the stepped gear shifting unit 60 via the intermediate transmission member 76. In the stepless gear shifting unit 58, a relationship between the rotation speed of the sun gear S1 and the rotation speed of the ring gear R1 is represented by straight lines L0e and L0m crossing the vertical line Y2.

In the stepped gear shifting unit 60, the fourth rotary element RE4 is selectively connected to the intermediate transmission member 76 via the clutch C1, the fifth rotary element RE5 is connected to the output shaft 74, the sixth rotary element RE6 is selectively connected to the intermediate transmission member 76 via the clutch C2 and selectively connected to the case 56 via the brake B2, and the seventh rotary element RE7 is selectively connected to the case 56 via the brake B1. In the stepped gear shifting unit 60, the rotation speeds of "1st," "2nd," "3rd," and "4th" in the output shaft 74 are represented by the straight lines L1, L2, L3, and L4 crossing the vertical line Y5 through engagement/disengagement control of the engagement devices CB.

The straight line L0e and the straight lines L1, L2, L3, and L4 which are indicated by solid lines in FIG. 6 denote relative speeds of the rotary elements at the time of forward travel in an HV travel mode with at least the engine 12 as a drive power source for travel. In the HV travel mode, the engine 12 is a main drive power source for travel, and the first rotary machine MG1 and the second rotary machine MG2 are auxiliary drive power sources for travel according to necessity. In the HV travel mode, in the differential mechanism 80, when a reaction torque which is a negative torque of the first rotary machine MG1 with respect to the engine torque Te input to the carrier CA1 is input to the sun gear Si at the time of positive rotation, a direct engine-transmitted torque Td [Nm] $(=Te/(1+\rho1)=-(1/\rho1)\times Tg)$ which is a positive torque at the time of positive rotation appears in the ring gear R1. A combined torque of the direct engine-transmitted torque Td and the MG2 torque Tm is transmitted to the driving wheels 16 as a drive torque Tw in the forward moving direction of the vehicle 10 to the driving wheels 16 via the stepped gear shifting unit 60 in which one AT gear stage out of the first AT gear stage to the fourth AT gear stage is formed according to required drive power Pwdem. At this time, the first rotary machine MG1 serves as a power generator that generates a negative torque at the time of positive rotation. Generated electric power Wg [W] of the first rotary machine MG1 is charged in the battery 54 or is consumed in the second rotary machine MG2. The second rotary machine MG2 outputs the MG2 torque Tm using all or some of the generated electric power Wg or electric power from the battery 54 in addition to the generated electric power Wg.

The straight line L0m indicated by an alternate long and short dash line in FIG. 6 and the straight lines L1, L2, L3, and L4 indicated by solid lines in FIG. 6 denote relative speeds of the rotary elements at the time of forward travel in an electric-vehicle travel mode (hereinafter referred to as an EV travel mode) using at least one rotary machine of the first rotary machine MG1 and the second rotary machine MG2 as a drive power source for travel in a state in which the operation of the engine 12 is stopped. The forward travel in the EV travel mode includes, for example, a single-driven EV travel mode in which the engine 12 is not used as a drive power source for travel and only the second rotary machine MG2 is used as a drive power source for travel and a double-driven EV travel mode in which the engine 12 is not used as a drive power source for travel and both the first rotary machine MG1 and the second rotary machine MG2 are used as drive power sources for travel. The second rotary machine MG2 is an example of a "rotary machine" in the claims.

In the single-driven EV travel mode, the carrier CA1 does not rotate and the MG2 torque Tm which is a positive torque at the time of positive rotation is input to the ring gear R1. At this time, the first rotary machine MG1 connected to the sun gear S1 enters a no-load state and idles at the time of negative rotation. In the single-driven EV travel mode, the one-way clutch F0 is disengaged and the input shaft 72 is not fixed to the case 56.

In the double-driven EV travel mode, when the MG1 torque Tg which is a negative torque at the time of negative rotation is input to the sun gear Si in a state in which the carrier CA1 does not rotate, the one-way clutch F0 is automatically engaged such that rotation in the negative rotating direction of the carrier CA1 is prohibited. In the state in which the carrier CA1 is fixed to be non-rotatable by engagement of the one-way clutch F0, a reaction torque based on the MG1 torque Tg is input to the ring gear R1. In the double-driven EV travel mode, similarly to the single-driven EV travel mode, the MG2 torque Tm is input to the ring gear R1

At the time of forward travel in the single-driven EV travel mode and the double-driven EV travel mode, the engine 12 is not driven, the engine rotation speed Ne is zero, and at least one torque of the MG1 torque Tg and the MG2 torque Tm is transmitted to the driving wheels 16 via the stepped gear shifting unit 60 in which one AT gear stage out of the AT first gear stage to the fourth AT gear stage is formed as a drive torque Tw in the forward travel direction of the vehicle 10. At the time of forward travel in the single-driven EV travel mode and the double-driven EV travel mode, the engine 12 is not driven, the MG1 torque Tg is a powering torque which is a negative torque at the time of negative rotation and the MG2 torque Tm is a powering torque which is a positive torque at the time of positive rotation.

In the HV travel mode, when the required drive power Pwdem which is required for the vehicle 10 changes, the target engine operating point OPengtgt for acquiring required engine power Pedem for realizing the required drive power Pwdem is set.

In the HV travel mode, when the rotation speed of the sun gear S1 increases or decreases by controlling the rotation speed of the first rotary machine MG1 with respect to the rotation speed of the ring gear R1 which is constrained to rotation of the driving wheels 16 with formation of an AT gear stage in the stepped gear shifting unit 60, the rotation speed of the carrier CA1, that is, the engine rotation speed Ne, increases or decreases. Accordingly, in the HV travel mode, the engine 12 can operate at an engine operating point Peng with high efficiency. The composite transmission 62 including the stepped gear shifting unit 60 in which an AT gear stage is formed and the stepless gear shifting unit 58 operating as a stepless transmission can constitute a stepless transmission.

Referring back to FIG. 1, the vehicle 10 includes the electronic control unit 100 serving as a controller for the vehicle 10 associated with control of the engine 12, the first rotary machine MG1, the second rotary machine MG2, and the like. The electronic control unit 100 is configured to include a so-called microcomputer including, for example, a CPU, a RAM, a ROM, and an input and output interface, and the CPU performs various types of control of the vehicle 10 by performing signal processing in accordance with a program which is stored in the ROM in advance while using a temporary storage function of the RAM. The electronic control unit 100 is configured to include a computer for engine control, a computer for rotary machine control, and a computer for hydraulic pressure control according to necessity. The electronic control unit 100 is an example of a "control unit" in the claims.

The electronic control unit 100 is supplied with various signals (for example, a supercharging pressure Pchg, a throttle valve opening θth, an engine rotation speed Ne, an output rotation speed No which is the rotation speed of the output shaft 74 corresponding to a vehicle speed V, an MG1 rotation speed Ng [rpm] which is the rotation speed of the first rotary machine MG1, an MG2 rotation speed Nm which is the rotation speed of the second rotary machine MG2, a compressor rotation speed Ncmp [rpm] which is the rotation speed of the electric compressor 48c, an accelerator opening θacc which is an accelerator operation amount indicating the magnitude of the driver's acceleration operation, and a battery temperature THbat [° C], a battery charging/discharging current Ibat [mA], or a battery voltage Vbat [V] of the battery 54) based on detection values from various sensors (for example, a supercharging pressure sensor 40, a throttle valve opening sensor 44, an engine rotation speed sensor 88, an output rotation speed sensor 90, an MG1 rotation speed sensor 92A, an MG2 rotation speed sensor 92B, a compressor rotation speed sensor 94, an accelerator opening sensor 96, and a battery sensor 98) which are provided in the vehicle 10. The compressor rotation speed Ncmp which is the rotation speed of the electric compressor 48c in the supercharger SC is an example of a "compressor rotation speed" in the claims, and a rate of increase ΔNcmp which is a rate of increase of the compressor rotation speed Ncmp is an example of a "rate of increase of the compressor rotation speed" in the claims. The rate of increase ΔNcmp of the compressor rotation speed is an amount of increase per unit time, that is, an increase speed, of the compressor rotation speed Ncmp.

The electronic control unit 100 outputs various command signals (for example, an engine control command signal Se for controlling the engine 12, a rotary machine control command signal Smg for controlling the first rotary machine MG1 and the second rotary machine MG2, a hydraulic pressure control command signal Sp for controlling the operating states of the engagement devices CB) to various devices (for example, the engine control device 50, the inverter 52, and the hydraulic pressure control circuit 84) which are provided in the vehicle 10.

The electronic control unit 100 calculates a state of charge value SOC which is a value indicating the state of charge of the battery 54, for example, based on the battery charging/discharging current Ibat and the battery voltage Vbat. The electronic control unit 100 calculates chargeable power Win [W] and dischargeable electric power Wout [W] for defining a feasible range of battery electric power Pbat [W] which is the power of the battery 54, for example, based on the battery temperature THbat and the state of charge value SOC of the battery 54. The chargeable power Win and the dischargeable electric power Wout are set to curb deterioration of the battery 54. The chargeable power Win is possible input power for defining a limitation of charging electric power of the battery 54 and the dischargeable electric power Wout is possible output power for defining a limitation of discharging electric power Wdis [W] of the battery 54. Accordingly, in view of deterioration of the battery 54, it is not preferable for the charging electric power of the battery 54 to exceed the chargeable power Win for a long time or for the discharging electric power Wdis of the battery 54 to exceed the dischargeable electric power Wout for a long time. For example, in order to curb the deterioration of the battery 54, the chargeable power Win and the dischargeable electric power Wout decrease as the battery temperature THbat decreases in a low-temperature area in which the battery temperature THbat is lower than that in a normal area, and decreases as the battery temperature THbat increases in a high-temperature area in which the battery temperature THbat is higher than that in the normal area. For example, the chargeable power Win decreases as the state of charge value SOC increases in an area in which the state of charge value SOC is high. For example, the dischargeable electric power Wout decreases as the state of charge value SOC decreases, that is, as necessity for charging of the battery 54 increases, in an area in which the state of charge value SOC is low. The dischargeable electric power Wout is an example of "upper-limit discharging electric power" in the claims.

The electronic control unit 100 functionally includes a determination unit 102, a prediction unit 104, and a control unit 106.

When execution of downshift in the stepped gear shifting unit 60 is determined, the determination unit 102 determines whether the dischargeable electric power Wout is limited. For example, in a relationship including upshift lines and downshift lines which is stored in advance with the vehicle speed V and the accelerator opening θacc as variables (a gear shifting graph or a gear shifting map which is not illustrated), execution of downshift is determined when a point indicating a vehicle condition based on the vehicle speed V and the accelerator opening θacc crosses a downshift line. Whether the dischargeable electric power Wout is limited is determined, for example, based on whether the dischargeable electric power Wout is less than a predetermined determination electric power value Woutj.

Here, a predetermined target gear shifting period Ttrns [ms] is a target value of a predetermined time period (a gear shifting period from start to end of gear shifting) required for progress of gear shifting in consideration of balance between gear shifting shock and gear shifting responsiveness in execution of a downshift. A predetermined basic value ΔNcmp0 is a predetermined standard value of the rate of increase ΔNcmp [rpm/ms] of the compressor rotation speed at the time of execution of a downshift. The "time of execution of a downshift" refers to a "period in which control of a downshift is performed" and is, for example, a period in which so-called clutch-to-clutch gear shifting of switching the AT gear stage in the stepped gear shifting unit 60 is performed.

In any type of downshift which will be described later, when the rate of increase ΔNcmp of the compressor rotation speed at the time of execution of a downshift is the predetermined basic value ΔNcmp0 and the dischargeable electric power Wout is equal to or greater than the predetermined determination electric power value Woutj, an assist torque for increasing the AT input rotation speed Nati of the stepped gear shifting unit 60 to a rotation speed corresponding to the AT gear stage after the downshift within the predetermined target gear shifting period Ttrns can be output from the second rotary machine MG2 even if an increase of the engine torque Te is delayed due to a response delay of the supercharging pressure Pchg. In this way, the predetermined basic value ΔNcmp0 and the predetermined determination electric power value Woutj are set in advance by experiment or design. Here, the assist torque is the MG2 torque Tm which is output from the second rotary machine MG2 and transmitted to the driving wheels 16 in order to compensate for a shortage of the engine torque Te which is output from the engine 12 which is a main drive power source for travel and transmitted to the driving wheels 16.

When the determination unit 102 determines that the dischargeable electric power Wout is limited, the prediction unit 104 predicts whether necessary discharging electric power Wnd [W] from the battery 54 required for performing a downshift in the stepped gear shifting unit 60 in the HV travel mode exceeds the dischargeable electric power Wout of the battery 54.

The necessary discharging electric power Wnd is discharging electric power Wdis from the battery 54 (power consumption in the second rotary machine MG2 or the like) when the rate of increase ΔNcmp of the compressor rotation speed is the basic value ΔNcmp0 and gear shifting control is performed such that a downshift ends within the predetermined target gear shifting period Ttrns, and is a maximum power value in a period from start to end of the downshift. For example, the necessary discharging electric power Wnd varies depending on the type of combination of an AT gear stage before switching and an AT gear stage after switching (a type of a downshift) when the downshift is performed. Accordingly, the prediction unit 104 estimates the necessary discharging electric power Wnd by applying the type of combination of the AT gear stages before and after switching in a downshift which is actually going to be performed to a predetermined map in which a relationship between the type of combination of the AT gear stages before and after switching in the downshift and the necessary discharging electric power Wnd is stored in advance.

When the prediction unit 104 predicts that the necessary discharging electric power Wnd exceeds the dischargeable electric power Wout, the control unit 106 controls the rate of increase ΔNcmp of the compressor rotation speed at the time of execution of a downshift based on the dischargeable electric power Wout and the target supercharging pressure Pchgtgt. The control unit 106 controls the compressor rotation speed Ncmp and the rate of increase ΔNcmp of the compressor rotation speed at the time of execution of a downshift, for example, by controlling the rotation speed of the electric motor 48$m$ at the time of execution of the downshift.

When a rate of increase of the engine torque Te is low due to a response delay of the supercharging pressure Pchg and the assist torque required to increase the AT input rotation speed Nati of the stepped gear shifting unit 60 within the predetermined target gear shifting period Ttrns is to be output from the second rotary machine MG2, the necessary discharging electric power Wnd is more likely to exceed the dischargeable electric power Wout when the dischargeable electric power Wout is small than when the dischargeable electric power Wout is great. In order to prevent the necessary discharging electric power Wnd from exceeding the dischargeable electric power Wout, it is necessary to decrease the assist torque which is output from the second rotary machine MG2 and there is concern of a decrease in gear shifting responsiveness (there is concern of an actual gear shifting period exceeding the predetermined target gear shifting period Ttrns).

Figure 7:
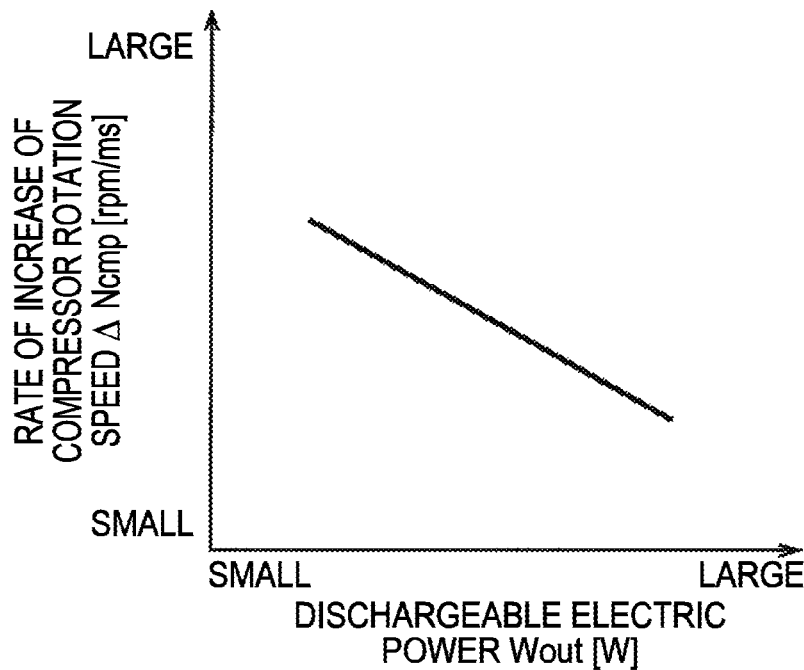
FIG. 7 is a diagram illustrating a relationship between dischargeable electric power of a battery illustrated in FIG. 1 and a rate of increase of a compressor rotation speed of a supercharger.

FIG. 7 is a diagram illustrating a relationship between the dischargeable electric power Wout and the rate of increase ΔNcmp of the compressor rotation speed. The control unit 106 performs control such that the rate of increase ΔNcmp of the compressor rotation speed at the time of execution of a downshift is greater when the dischargeable electric power Wout is small than when the dischargeable electric power Wout is great. This means that, when conditions other than the dischargeable electric power Wout are the same (for example, when the target supercharging pressure Pchgtgt which will be described later is constant), control is performed such that the rate of increase ΔNcmp of the compressor rotation speed is greater when the dischargeable electric power Wout is small than when the dischargeable electric power Wout is great, and does not mean that, when conditions other than the dischargeable electric power Wout are different, control is performed such that the rate of increase ΔNcmp of the compressor rotation speed is greater when the dischargeable electric power Wout is small than when the dischargeable electric power Wout is great. In this way, the control unit 106 performs control such that the rate of increase ΔNcmp of the compressor rotation speed at the time of execution of a downshift in the stepped gear shifting unit 60 increases as the dischargeable electric power Wout decreases.

When the target supercharging pressure Pchgtgt is high, the rate of increase of the engine torque Te is more likely to decrease due to a response delay of the supercharging pressure Pchg when the target supercharging pressure Pchgtgt is low, and the amount of assist torque of the second rotary machine MG2 required to increase the AT input rotation speed Nati of the stepped gear shifting unit 60 within the predetermined target gear shifting period Ttrns increases. Since a discharge power from the battery 54 to the second rotary machine MG2 increases due to the decrease in the amount of assist torque, the necessary discharging electric power Wnd increases. When the target supercharging pressure Pchgtgt is high, the necessary discharging electric power Wnd is more likely to exceed the dischargeable electric power Wout than when the target supercharging pressure Pchgtgt is low. In order to prevent the necessary discharging electric power Wnd from exceeding the dischargeable electric power Wout, it is necessary to decrease the assist torque which is output from the second rotary machine MG2 and there is concern of deterioration in gear shifting responsiveness.

Figure 8:
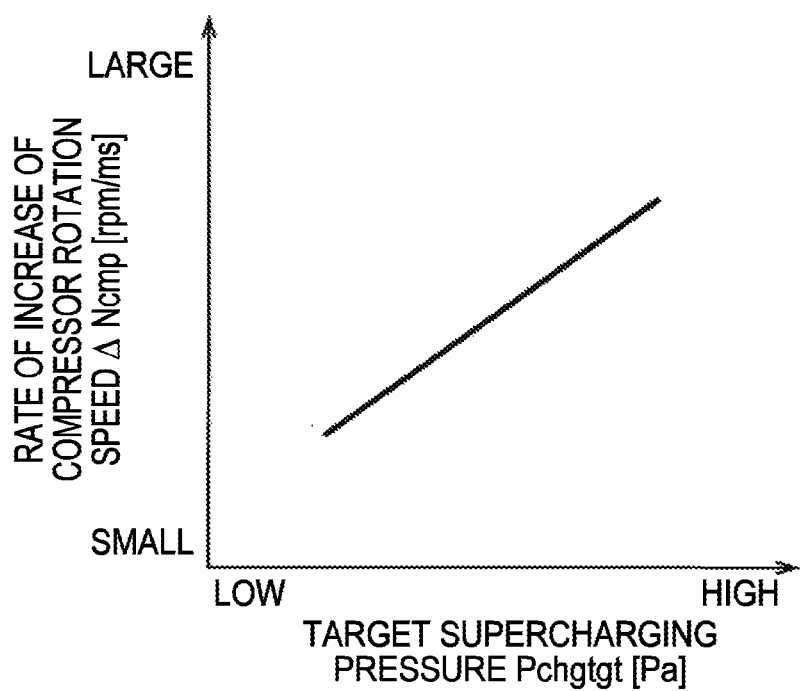
FIG. 8 is a diagram illustrating a relationship between a target supercharging pressure of the supercharger and the rate of increase of the compressor rotation speed.

FIG. 8 is a diagram illustrating a relationship between the target supercharging pressure Pchgtgt and the rate of increase ΔNcmp of the compressor rotation speed. The control unit 106 performs control such that the rate of increase ΔNcmp of the compressor rotation speed at the time of execution of a downshift is greater when the target supercharging pressure Pchgtgt is high than when the target supercharging pressure Pchgtgt is low. This means that, when conditions other than the target supercharging pressure Pchgtgt are the same (for example, when the dischargeable electric power Wout is the same), control is performed such that the rate of increase ΔNcmp of the compressor rotation speed is necessarily greater when the target supercharging pressure Pchgtgt is high than when the target supercharging pressure Pchgtgt is low, and does not mean that, when conditions other than the target supercharging pressure Pchgtgt are different, control is performed such that the rate of increase ΔNcmp of the compressor rotation speed is greater when the target supercharging pressure Pchgtgt is high than when the target supercharging pressure Pchgtgt is low. In this way, the control unit 106 performs control such that the rate of increase ΔNcmp of the compressor rotation speed at the time of execution of a downshift in the stepped gear shifting unit 60 increases as the target supercharging pressure Pchgtgt increases.

As described above with reference to FIGS. 7 and 8, the control unit 106 controls the rate of increase ΔNcmp of the compressor rotation speed at the time of execution of a downshift using the dischargeable electric power Wout and the target supercharging pressure Pchgtgt as variables. The control unit 106 controls the rate of increase ΔNcmp of the compressor rotation speed in at least a part of a period in which the downshift is performed (a period in which downshift control is performed) such that the supercharging pressure Pchg reaches the target supercharging pressure Pchgtgt within the predetermined target gear shifting period Ttrns.

When the prediction unit 104 predicts that the necessary discharging electric power Wnd does not exceed the dischargeable electric power Wout, the control unit 106 performs control such that the rate of increase ΔNcmp of the compressor rotation speed at the time of execution of the downshift reaches the basic value ΔNcmp0. When the determination unit 102 determines that the dischargeable electric power Wout is not limited, the control unit 106 also performs control such that the rate of increase ΔNcmp of the compressor rotation speed at the time of execution of the downshift reaches the basic value ΔNcmp0.

Figure 9:
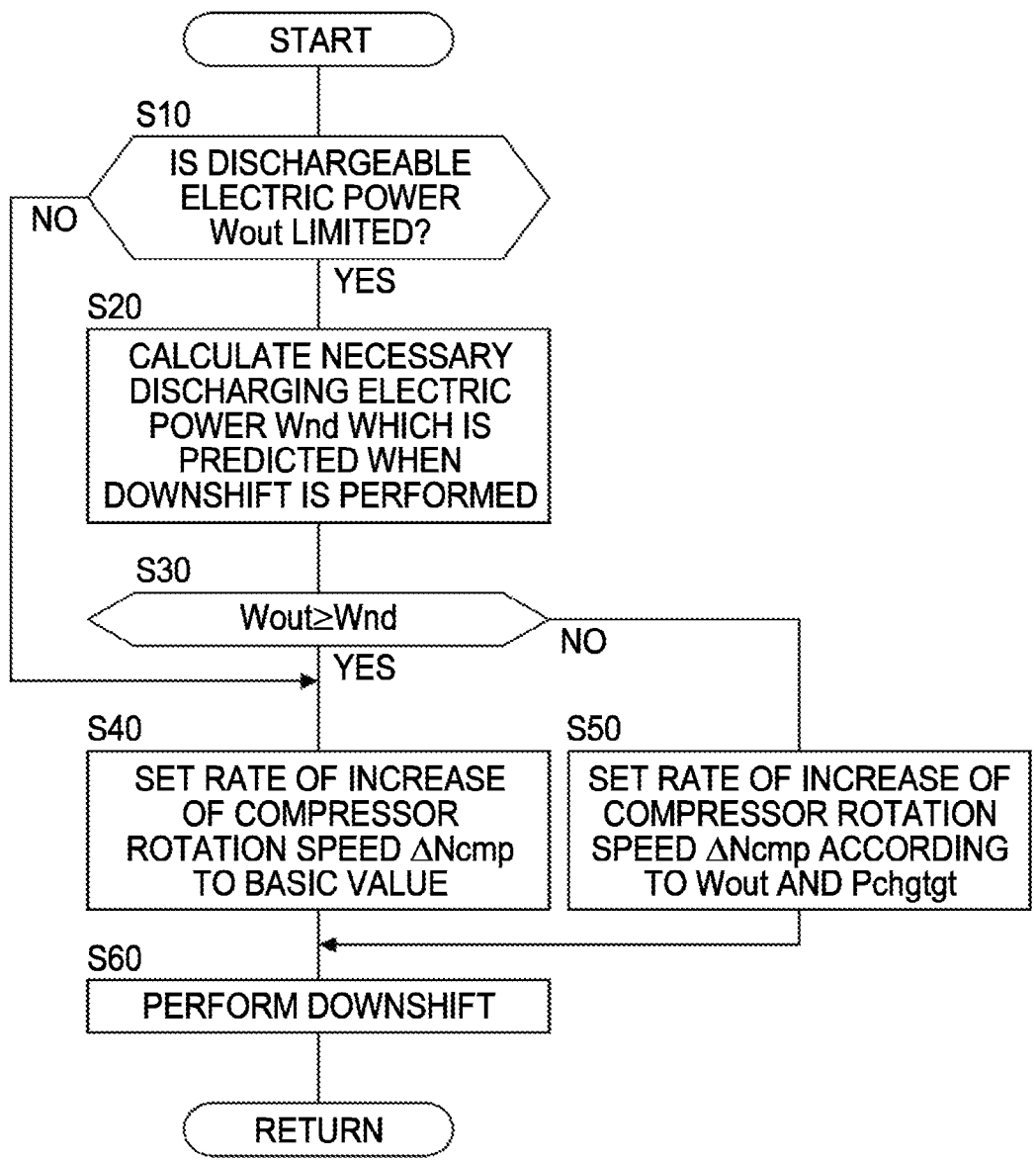
FIG. 9 is a diagram illustrating an example of a flowchart of a principal part of a control operation of the electronic control unit.

FIG. 9 illustrates an example of a flowchart illustrating a principal part of a control operation of the electronic control unit 100. The flowchart illustrated in FIG. 9 is performed when it is determined that a downshift in the stepped gear shifting unit 60 is to be performed.

First, in Step S10 corresponding to the function of the determination unit 102, it is determined whether the dischargeable electric power Wout is limited. When the determination result of Step S10 is positive, Step S20 is performed. When the determination result of Step S10 is negative, Step S40 is performed.

In Step S20 corresponding to the function of the prediction unit 104, necessary discharging electric power Wnd which is predicted when a downshift is performed is calculated. Then, Step S30 is performed.

In Step S30 corresponding to the function of the prediction unit 104, it is predicted whether the necessary discharging electric power Wnd is equal to or less than the dischargeable electric power Wout. When the necessary discharging electric power Wnd is equal to or less than the dischargeable electric power Wout (that is, when the necessary discharging electric power Wnd does not exceed the dischargeable electric power Wout), the determination result of Step S30 is positive. When the necessary discharging electric power Wnd exceeds the dischargeable electric power Wout, the determination result of Step S30 is negative. When the determination result of Step S30 is positive, Step S40 is performed. When the determination result of Step S30 is negative, Step S50 is performed.

In Step S40 corresponding to the function of the control unit 106, the rate of increase ΔNcmp of the compressor rotation speed at the time of execution of the downshift is set to the basic value ΔNcmp0. Then, Step S60 is performed.

In Step S50 corresponding to the function of the control unit 106, the rate of increase ΔNcmp of the compressor rotation speed at the time of execution of the downshift is set based on the dischargeable electric power Wout and the target supercharging pressure Pchgtgt. Suitably, the rate of increase ΔNcmp of the compressor rotation speed which is set in Step S50 has a value greater than the basic value ΔNcmp0 which is set in Step S40 and is determined based on the dischargeable electric power Wout and the target supercharging pressure Pchgtgt. Then, Step S60 is performed.

In Step S60 corresponding to the function of the control unit 106, the compressor rotation speed Ncmp is controlled such that the rate of increase ΔNcmp of the compressor rotation speed reaches the value set in Step S40 or S50, and the downshift is performed.

Figure 10:
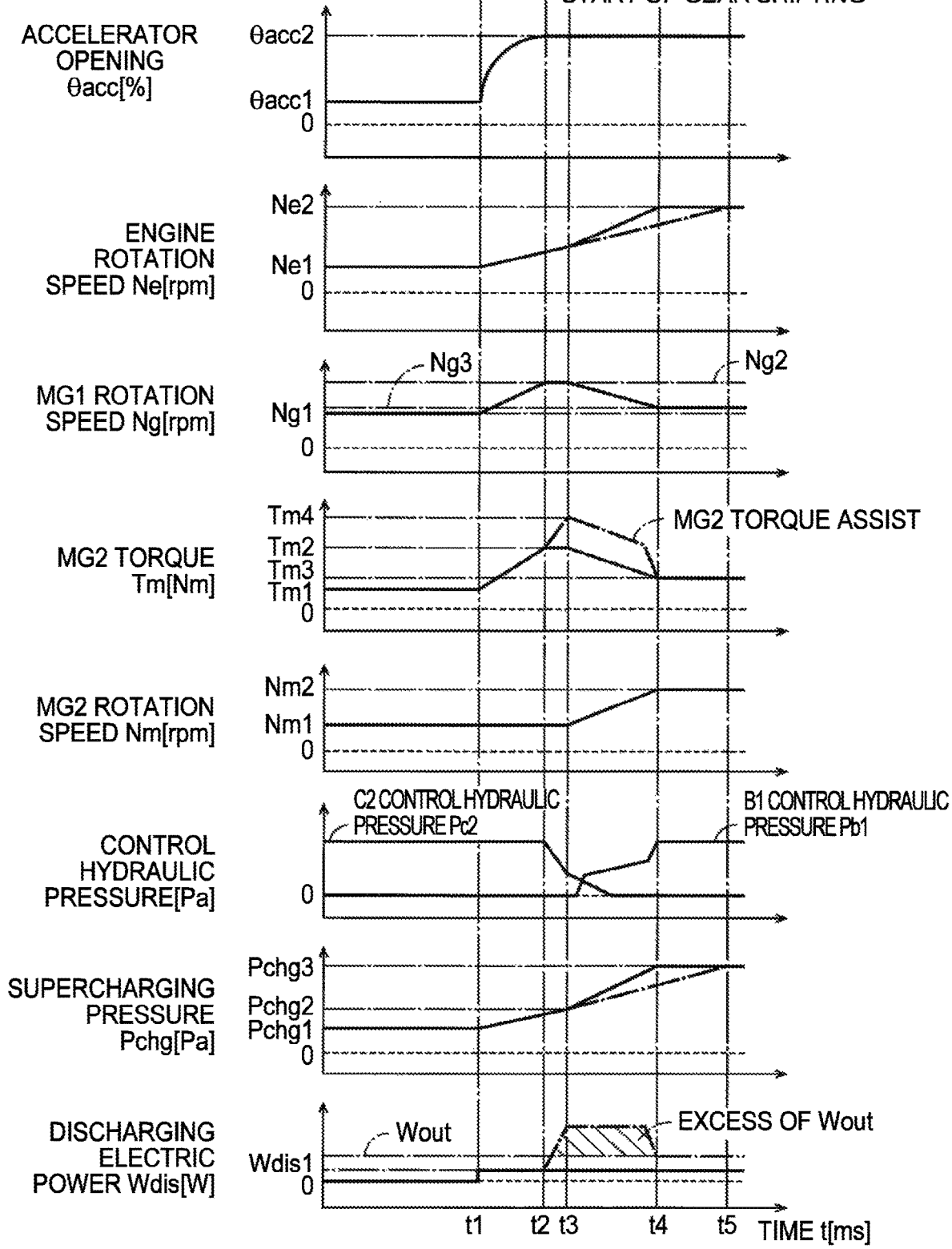
FIG. 10 is a diagram illustrating an example of a timing chart when the control operation of the electronic control unit illustrated in FIG. 9 is performed.

FIG. 10 illustrates an example of a timing chart when the control operation of the electronic control unit 100 illustrated in FIG. 9 is performed.

In FIG. 10, the horizontal axis represents time t [ms] and the vertical axis represents the accelerator opening θacc, the engine rotation speed Ne, the MG1 rotation speed Ng, the MG2 torque Tm, the MG2 rotation speed Nm, control hydraulic pressures Pc2 [Pa] and Pb1 [Pa] of the clutch C2 and the brake B1, the supercharging pressure Pchg, and the discharging electric power Wdis sequentially from the top. Graphs when control is performed such that the rate of increase ΔNcmp of the compressor rotation speed at the time of execution of the downshift is greater than the basic value ΔNcmp0 according to the first embodiment are indicated by bold solid lines, and graphs when control is performed such that the rate of increase ΔNcmp of the compressor rotation speed at the time of execution of the downshift reaches the basic value ΔNcmp0 according to a comparative example are indicated by bold alternate long and short dash lines.

First, the graphs (bold solid lines) when control is performed such that the rate of increase ΔNcmp of the compressor rotation speed at the time of execution of the downshift is greater than the basic value ΔNcmp0 according to the first embodiment indicated by bold solid lines will be described below.

In a period before time tl, the accelerator opening θacc has an accelerator opening value θacc1 (>0) and the vehicle 10 is traveling in a state in which the third AT gear stage ("3rd") is formed in the stepped gear shifting unit 60 based on the accelerator opening value θacc1 and the vehicle speed V. The first rotary machine MG1 serves as a power generator that generates a negative torque at a positive rotation speed value Ng1 (>0), and electric power Wg generated by the first rotary machine MG1 is consumed in the second rotary machine MG2. Accordingly, the MG2 torque Tm which is output from the second rotary machine MG2 is a powering torque, and the discharging electric power Wdis is 0.

In a period between time t1 and slightly before time t2 (>t1), the accelerator opening θacc increases from the accelerator opening value θacc1 to an accelerator opening value θacc2 (>θacc1), for example, by a driver's depression of an accelerator pedal. The required drive power Pwdem increases with the increase in the accelerator opening eacc, and execution of a downshift from the third AT gear stage ("3rd") to the second AT gear stage ("2nd") in the stepped gear shifting unit 60 is determined based on a gear shifting line which is not illustrated.

In a period from time t1 to time t2, with the increase in the accelerator opening θacc, the engine rotation speed Ne increases, the MG1 rotation speed Ng increases from a rotation speed value Ng1 to a rotation speed value Ng2, and the MG2 torque Tm increases from a torque value Tm1 to a torque value Tm2 (>Tm1). With the increase in the engine rotation speed Ne, the supercharging pressure Pchg also increases by rotational driving of the compressor 18c of the exhaust turbine type supercharger 18. The discharging electric power Wdis increases to a power value Wdis1 (>0) to increase the MG2 torque Tm.

Gear shifting control is started at time t2, and the gear shifting control is ended at time t4 (>t2). The period from time t2 to time t4 is a period in which a downshift is performed.

In the period from time t2 to time t4, a control hydraulic pressure Pc2 for controlling engagement and disengagement of the clutch C2 changes gradually from a high state to a low state. On the other hand, in the period from time t2 to time t4, a control hydraulic pressure Pb1 for controlling engagement and disengagement of the brake B1 changes gradually from a low state to a high state. In this way, in the period of gear shifting control from time t2 to time t4, the disengagement operation of the clutch C2 and the engagement operation of the brake B1 in the downshift from the third AT gear stage to the second AT gear stage are performed by so-called clutch-to-clutch gear shifting.

When a downshift is performed, control is performed such that the rate of increase ΔNcmp of the compressor rotation speed becomes greater than the basic value ΔNcmp0. Accordingly, the supercharging pressure Pchg in a period from time t3 to time t4 (t2<t3<t4) increases more rapidly from a pressure value Pchg2 to a pressure value Pchg3 (>Pchg2) in comparison with a comparative example which will be described later. The pressure value Pchg3 is a target supercharging pressure Pchgtgt which is determined based on the accelerator opening value θacc2.

In the period from time t2 to time t4, the engine rotation speed Ne increases rapidly to a rotation speed value Ne2 (>Ne1). On the other hand, the MG1 rotation speed Ng decreases gradually from a rotation speed value Ng2 to a rotation speed value Ng3 (<Ng2). In the period from time t2 to time t4, the MG2 torque Tm decreases from a torque value Tm2 to a torque value Tm3 (Tm1<Tm3<Tm2). The MG2 rotation speed Nm (=the AT input rotation speed Nati of the stepped gear shifting unit 60) increases from a rotation speed value Nm1 to a rotation speed value Nm2 (>Nm1) due to the MG2 torque Tm. By rapidly increasing the supercharging pressure Pchg, the engine rotation speed Ne increases rapidly, the AT input rotation speed Nati (=MG2 rotation speed Nm) of the stepped gear shifting unit 60 at the time of execution of a downshift increases rapidly even when the MG2 torque Tm is equal to or less than the torque value Tm2 (a torque value Tm4 (>Tm2) in the comparative example), and the discharging electric power Wdis of the battery 54 becomes equal to or less than the dischargeable electric power Wout.

For the purpose of easy understanding of the disclosure, the discharging electric power Wdis in the period in which the downshift is performed (the period from time t2 to time t4) is illustrated as a constant power value Wdis1, but the discharging electric power Wdis varies actually. Even when the discharging electric power Wdis varies, the necessary discharging electric power Wnd which has the maximum value thereof is less than the dischargeable electric power Wout.

After time t4, the engine rotation speed Ne is kept at the rotation speed value Ne2, the MG1 rotation speed Ng is kept at the rotation speed value Ng3, and the MG2 torque Tm is kept at the torque value Tm3. The supercharging pressure Pchg is kept at the pressure value Pchg3, and the discharging electric power Wdis is kept lower than the dischargeable electric power Wout. The control hydraulic pressure Pc2 is kept in a low state, the control hydraulic pressure Pb1 is kept in a high state, and the gear stage which is formed in the stepped gear shifting unit 60 is shifted to the second AT gear stage.

The graphs (bold alternate long and short dash lines) when control is performed such that the rate of increase ΔNcmp of the compressor rotation speed at the time of execution of the downshift reaches the basic value ΔNcmp0 according to a comparative example will be described below. In the graphs according to the comparative example, description of the same parts as in the graphs according to the first embodiment will be appropriately omitted.

At time t2, gear shifting control is started. Since control is performed such that the rate of increase ΔNcmp of the compressor rotation speed at the time of execution of the downshift reaches the basic value ΔNcmp0 in a period from time t2 to time t5 (>t4), the supercharging pressure Pchg in a period from time t3 to time t5 increases more slowly from the pressure value Pchg2 to the pressure value Pchg3 in comparison with the first embodiment.

In the period from time t2 to time t5, the engine rotation speed Ne increases slowly to the rotation speed value Ne2.

In order to improve gear shifting responsiveness in the downshift according to the comparative example, it is necessary to output a great assist torque from the second rotary machine MG2 such that the AT input rotation speed Nati of the stepped gear shifting unit 60 increases rapidly. Similarly to the graphs according to the first embodiment, the MG2 torque Tm which is required to rapidly increase the MG2 rotation speed Nm such that the AT input rotation speed Nati (=MG2 rotation speed Nm) reaches the rotation speed value Nm2 at time t4 is indicated by a bold alternate long and short dash line. However, in order to output the MG2 torque Tm which is indicated by the bold alternate long and short dash line, the discharging electric power Wdis of the battery 54 exceeds the dischargeable electric power Wout as indicated by the bold alternate long and short dash line (and a hatched part). Accordingly, since the MG2 torque Tm required as the assist torque cannot be output, a gear shifting period has to be elongated to deteriorate the gear shifting responsiveness.

Accordingly, the gear shifting control ends later than in the first embodiment, for example, the gear shifting control ends at time t5. The period from time t2 to time t5 is a period in which the downshift is performed in the comparative example. In this way, the gear shifting period (=t5-t2) of a downshift according to the comparative example is longer than the gear shifting period (=t4-t2) of the downshift according to the first embodiment, and gear shifting responsiveness is worse.

The vehicle 10 in which the electronic control unit 100 according to the first embodiment is mounted includes the engine 12 with the supercharger SC, the second rotary machine MG2, and the battery 54 that transmits and receives electric power to and from the second rotary machine MG2, uses power which is output from the engine 12 and the second rotary machine MG2 as a drive power for travel, and includes the stepped gear shifting unit 60 in the power transmission path PT between the engine 12 and the driving wheels 16 and between the second rotary machine MG2 and the driving wheels 16.

The controller for a hybrid vehicle according to the first embodiment includes the prediction unit 104 that predicts whether the necessary discharging electric power Wnd from the battery 54 which is required to perform a downshift in the stepped gear shifting unit 60 exceeds the dischargeable electric power Wout of the battery 54 when the downshift in the stepped gear shifting unit 60 is performed in the HV travel mode and the control unit 106 that controls the compressor rotation speed Ncmp such that the rate of increase ΔNcmp of the compressor rotation speed at the time of execution of the downshift in the stepped gear shifting unit 60 increases as the dischargeable electric power Wout decreases when it is predicted that the necessary discharging electric power Wnd exceeds the dischargeable electric power Wout. When a downshift in the stepped gear shifting unit 60 is performed, as the dischargeable electric power Wout of the battery 54 decreases, the rate of increase ΔNcmp of the compressor rotation speed increases, a response delay of the supercharging pressure Pchg decreases, and the rate of increase of the engine torque Te increases. Accordingly, it is possible to curb an amount of assist torque of the second rotary machine MG2 which is required to increase the AT input rotation speed Nati of the stepped gear shifting unit 60 and to decrease the discharging electric power Wdis from the battery 54. As a result, it is possible to prevent the necessary discharging electric power Wnd from the battery 54 which is required when a downshift in the stepped gear shifting unit 60 is performed from exceeding the dischargeable electric power Wout of the battery 54 and to curb deterioration in gear shifting responsiveness.

According to the first embodiment, the control unit 106 further controls the compressor rotation speed Ncmp such that the rate of increase ΔNcmp of the compressor rotation speed increases as the target supercharging pressure Pchgtgt increases. As the target supercharging pressure Pchgtgt increases, the rate of increase ΔNcmp of the compressor rotation speed increases and the supercharging pressure Pchg increases more rapidly. When a downshift in the stepped gear shifting unit 60 is performed, as the target supercharging pressure Pchgtgt increases, the rate of increase ΔNcmp of the compressor rotation speed increases, the rate of increase of the supercharging pressure Pchg becomes more suitable, and the response delay of the supercharging pressure Pchg decreases. Accordingly, it is possible to prevent the necessary discharging electric power Wnd from the battery 54 which is required when a downshift in the stepped gear shifting unit 60 is performed from exceeding the dischargeable electric power Wout of the battery 54 and to curb deterioration in gear shifting responsiveness.

According to the first embodiment, the prediction unit 104 estimates the necessary discharging electric power Wnd using a map in which the relationship between a type of combination of the AT gear stages before and after performing the downshift in the stepped gear shifting unit 60 and the necessary discharging electric power Wnd is stored in advance. By using the map in this way, it is possible to estimate the necessary discharging electric power Wnd before performing the downshift.

According to the first embodiment, the supercharger SC includes the electric supercharger 48 and the control unit 106 controls the compressor rotation speed Ncmp which is the rotation speed of the electric compressor 48c of the electric supercharger 48. Accordingly, for example, by controlling the rotation speed of the electric motor 48m which is connected to the electric compressor 48c, the rotation speed of the electric compressor 48c which is the compressor rotation speed Ncmp of the supercharger SC is controlled.

According to the first embodiment, the dischargeable electric power Wout is determined based on the battery temperature THbat and the state of charge value SOC. Accordingly, it is possible to curb progress of deterioration of the battery 54 and to determine the dischargeable electric power Wout according to necessity for charging of the battery 54.

According to the first embodiment, the dischargeable electric power Wout is determined to decrease as the degree of deterioration of the battery 54 increases. By determining the dischargeable electric power Wout to decrease as the degree of deterioration of the battery 54 increases in this way, it is possible to limit the battery charging/discharging current Ibat and thus to curb progress of deterioration of the battery 54.

According to the first embodiment, when the dischargeable electric power Wout is limited to be less than the predetermined determination electric power value Woutj, the control unit 106 controls the compressor rotation speed Ncmp such that the rate of increase ΔNcmp of the compressor rotation speed at the time of performing a downshift in the stepped gear shifting unit 60 increases as the dischargeable electric power Wout decreases. This is because there is a likelihood that the necessary discharging electric power Wnd will exceed the dischargeable electric power Wout when the dischargeable electric power Wout is limited.

Figure 11:
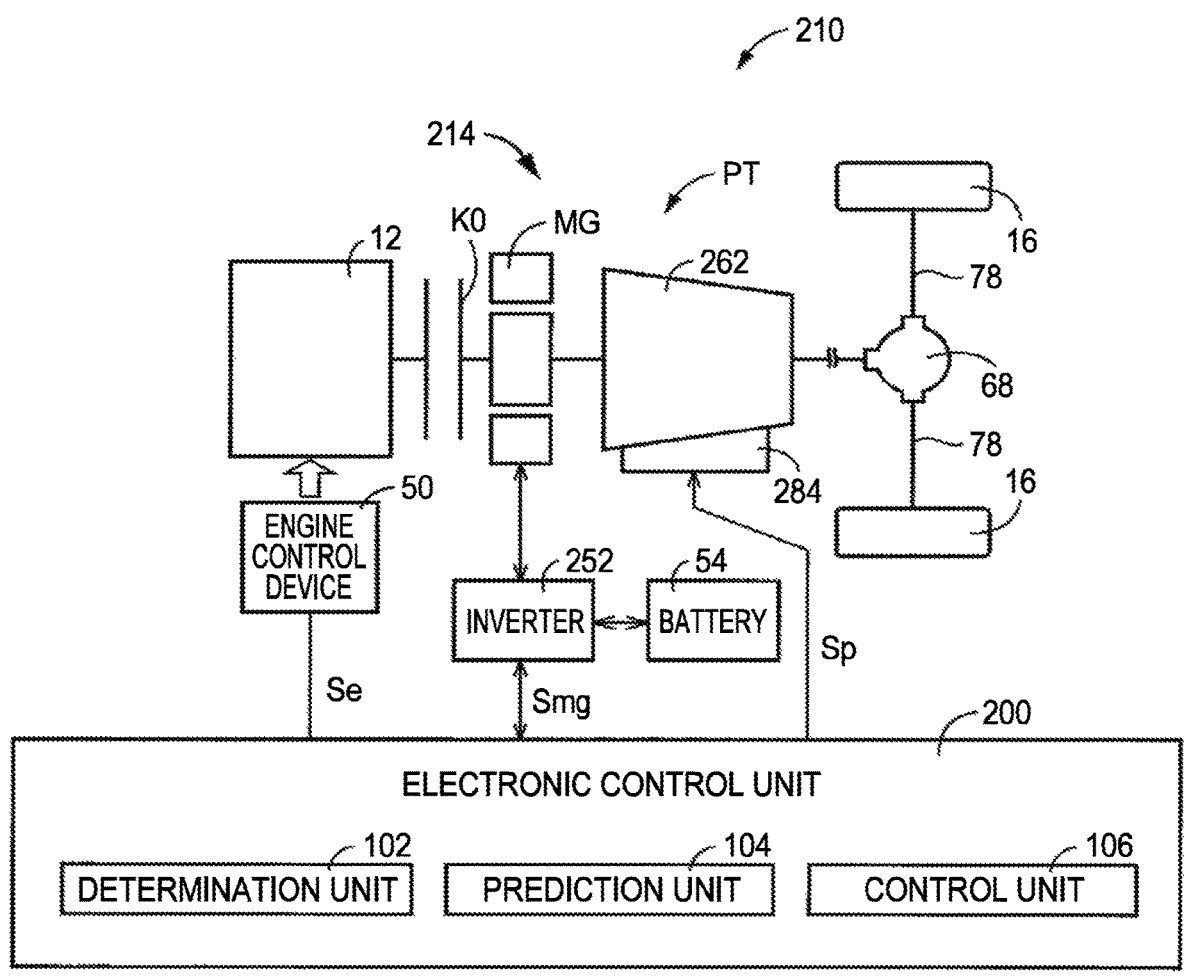
FIG. 11 is a functional block diagram schematically illustrating a configuration of a vehicle in which an electronic control unit according to a second embodiment of the disclosure is mounted and illustrating a principal part of a control function for various types of control in the vehicle.

FIG. 11 is a functional block diagram schematically illustrating a configuration of a vehicle 210 in which an electronic control unit 200 according to a second embodiment of the disclosure is mounted and illustrating a principal part of a control function for various types of control in the vehicle 210. The vehicle 210 is a hybrid vehicle including an engine 12, a rotary machine MG, a power transmission device 214, and driving wheels 16. Elements of the second embodiment which are substantially common to the functions of the first embodiment will be referred to by the same reference signs and description thereof will not be repeated.

An engine torque Te of the engine 12 is controlled by causing the electronic control unit 200 which will be described later to control an engine control device 50 which is provided in the vehicle 210.

The rotary machine MG is a rotary electric machine having a function of an electric motor and a function of a power generator and is called a motor generator. The rotary machine MG is connected to the battery 54 provided in the vehicle 210 via an inverter 252 provided in the vehicle 210. In the rotary machine MG, an MG torque Tmg which is an output torque of the rotary machine MG is controlled by causing the electronic control unit 200 which will be described later to control the inverter 252. A generated electric power Wg of the rotary machine MG is charged in the battery 54 or is consumed in an auxiliary machine such as an air conditioner. The rotary machine MG outputs the MG torque Tmg using electric power from the battery 54.

The power transmission device 214 includes a clutch K0 and an automatic transmission 262. An input rotary member of the automatic transmission 262 is connected to the engine 12 via the clutch K0 and is directly connected to the rotary machine MG. The power transmission device 214 includes a differential gear 68 that is connected to an output side of the automatic transmission 262 and a pair of axles 78 that is connected to the differential gear 68. In the power transmission device 214, power which is output from the engine 12 or the rotary machine MG is transmitted to the automatic transmission 262. Power transmitted to the automatic transmission 262 is transmitted to the driving wheels 16 via the differential gear 68, the pair of axles 78, and the like. The automatic transmission 262 is provided in a power transmission path PT which will be described later between the engine 12 and the driving wheels 16 and between the rotary machine MG and the driving wheels 16. The automatic transmission 262 is an example of a "transmission" in the claims.

The engine 12 and the rotary machine MG are drive power sources for travel of the vehicle 210 which are connected to the driving wheels 16 in a power-transmittable manner. The automatic transmission 262, the differential gear 68, and the axles 78 in the power transmission device 214 constitute the power transmission path PT provided between the engine 12 and the driving wheels 16 and between the rotary machine MG and the driving wheels 16. The rotary machine MG also has a function of a starter that cranks the engine 12 in a state in which the clutch K0 is engaged. The rotary machine MG in the second embodiment is an example of a "rotary machine" in the claims.

The clutch K0 is a hydraulic frictional engagement device that connects or disconnects transmission of power between the engine 12 and the rotary machine MG.

The automatic transmission 262 may be a stepped transmission and be, for example, a planetary gear type stepped transmission or a normally meshed type parallel axial stepped transmission. The automatic transmission 262 is controlled such that one of a plurality of gear stages with different gear ratios is formed by a hydraulic pressure control circuit 284 which is controlled by the electronic control unit 200 which will be described later. The automatic transmission 262 is an example of a "transmission" in the claims.

The vehicle 210 can perform EV travel in which only the rotary machine MG using electric power from the battery 54 is used as a drive power source for travel in a state in which the clutch K0 is disengaged and the operation of the engine 12 is stopped. The vehicle 210 can perform HV travel in which the engine 12 is caused to operate in a state in which the clutch Ko is engaged and at least the engine 12 is used as a drive power source for travel. That is, in the HV travel mode, the engine 12 serves as a main drive power source for travel and the rotary machine MG serves as an auxiliary drive power source for travel according to necessity.

The vehicle 210 further includes the electronic control unit 200 serving as a controller for the vehicle 210 associated with control of the engine 12, the rotary machine MG, and the like. The electronic control unit 200 has the same configuration as the electronic control unit 100 described above in the first embodiment. The electronic control unit 200 is supplied with various signals which are the same as those supplied to the electronic control unit 100. Here, an MG rotation speed Nmg [rpm] which is the rotation speed of the rotary machine MG detected by an MG rotation speed sensor which is not illustrated is input instead of the MG1 rotation speed Ng and the MG2 rotation speed Nm. Various command signals which are the same as those output from the electronic control unit 100 are output from the electronic control unit 200. A rotary machine control command signal Smg is a command signal for controlling the rotary machine MG.

Similarly to the electronic control unit 100, the electronic control unit 200 has the same functions as the functions of the determination unit 102, the prediction unit 104, and the control unit 106. Accordingly, similarly to the first embodiment, the prediction unit 104 predicts whether the necessary discharging electric power Wnd of the battery 54 which is required to perform a downshift in the automatic transmission 262 in the HV travel mode exceeds the dischargeable electric power Wout of the battery 54. When the prediction unit 104 predicts that the necessary discharging electric power Wnd exceeds the dischargeable electric power Wout, the control unit 106 controls the compressor rotation speed Ncmp such that the rate of increase ΔNcmp of the compressor rotation speed at the time of execution of a downshift in the automatic transmission 262 increases as the dischargeable electric power Wout decreases. The control unit 106 controls the compressor rotation speed Ncmp such that the rate of increase ΔNcmp of the compressor rotation speed increases as the target supercharging pressure Pchgtgt increases. The electronic control unit 200 is an example of a "controller" in the claims.

According to the second embodiment, the same advantages as in the first embodiment are obtained.

While the first and second embodiments of the disclosure have been described above in detail with reference to the accompanying drawings, the disclosure can be applied to other aspects.

In the first and second embodiments described above, the supercharger SC includes both the exhaust turbine type supercharger 18 and the electric supercharger 48, but the disclosure is not limited to this aspect. For example, the supercharger SC may include at least one of the exhaust turbine type supercharger 18 and the electric supercharger 48. When the supercharger SC includes only the exhaust turbine type supercharger 18, the rotation speed of the compressor 18c in the supercharger SC is an example of a "compressor rotation speed" in the claims, and control of the rate of increase of the compressor rotation speed is performed by adjusting the valve opening of the WGV 28v.

In the first and second embodiments, the rate of increase ΔNcmp of the compressor rotation speed at the time of execution of a downshift is determined based on two parameters of the dischargeable electric power Wout and the target supercharging pressure Pchgtgt, but the disclosure is not limited to this aspect. For example, the rate of increase ΔNcmp of the compressor rotation speed at the time of execution of a downshift may be determined based on only the dischargeable electric power Wout.

In the first and second embodiments, the dischargeable electric power Wout which is exemplified as the upper-limit discharging electric power is calculated based on the battery temperature THbat and the state of charge value SOC of the battery 54, but the disclosure is not limited to this aspect. For example, a degree of deterioration of the battery 54 may be estimated from a relationship between the degree of deterioration (a progressing state of deterioration) of the battery 54 and a current value of the battery charging/discharging current Ibat and cumulative data of the charging/discharging frequency which is determined by experiment in advance, and the dischargeable electric power Wout may be calculated based on the estimated degree of deterioration. For example, as the degree of deterioration of the battery 54 increases, the dischargeable electric power Wout decreases to delay progress of deterioration of the battery 54, and the battery charging/discharging current Ibat is limited to decrease. The dischargeable electric power Wout may be calculated based on the battery temperature THbat, the state of charge value SOC of the battery 54, and the degree of deterioration of the battery 54.

In the first and second embodiments, Step S10 in the flowchart illustrated in FIG. 9 is performed, but does not have to be performed. For example, Step S10 may be omitted in the flowchart illustrated in FIG. 9 and processes of Step S20 and steps subsequent thereto may be started. That is, regardless of whether the dischargeable electric power Wout is limited, (a) the prediction unit 104 may predict whether the necessary discharging electric power Wnd exceeds the dischargeable electric power Wout, (b) when the prediction unit 104 determines that the necessary discharging electric power Wnd exceeds the dischargeable electric power Wout, the control unit 106 may control the compressor rotation speed Ncmp such that the rate of increase ΔNcmp of the compressor rotation speed at the time of execution of a downshift in the stepped gear shifting unit 60 increases as the dischargeable electric power Wout decreases.

In the first embodiment and the second embodiment, forward travel is described, but the disclosure can also be applied to reverse travel.

In the first embodiment, the one-way clutch F0 is exemplified as a lock mechanism that can fix the carrier CA1 in a non-rotatable manner, but the disclosure is not limited to this aspect. For example, this lock mechanism may be an engagement device such as a mesh type clutch, a hydraulic frictional engagement device such as a clutch or a brake, a dry engagement device, an electromagnetic frictional engagement device, or a magnetic powder type clutch which selectively connects the input shaft 72 and the case 56. Alternatively, the vehicle 10 does not have to include the one-way clutch F0.

The above embodiments are merely exemplary and the disclosure can be embodied in various forms which have been subjected to various modifications and improvements based on knowledge of those skilled in the art without departing from the gist of the disclosure.

What is claimed is:

1. A controller for a hybrid vehicle, the hybrid vehicle including an engine with a supercharger serving as a drive power source for travel, a rotary machine serving as a drive power source for travel, a power storage device configured to transmit and receive electric power to and from the rotary machine, and a transmission that is provided in a power transmission path between the engine and driving wheels and between the rotary machine and the driving wheels, the controller comprising:
   a prediction unit configured to predict whether necessary discharging electric power from the power storage device which is required to perform downshift in the transmission exceeds upper-limit discharging electric power of the power storage device when downshift in the transmission is performed in a hybrid vehicle travel mode; and
   a control unit configured to control a compressor rotation speed such that a rate of increase of the compressor rotation speed of the supercharger at the time of performing downshift in the transmission increases as the upper-limit discharging electric power decreases when it is predicted that the necessary discharging electric power exceeds the upper-limit discharging electric power.

2. The controller for a hybrid vehicle according to claim 1, wherein the control unit is configured to control the compressor rotation speed such that the rate of increase of the compressor rotation speed increases as a target supercharging pressure increases.

3. The controller for a hybrid vehicle according to claim 1, wherein the prediction unit is configured to estimate the necessary discharging electric power using a map in which a relationship between a type of combination of gear stages before and after performing the downshift in the transmission and the necessary discharging electric power is determined in advance.

4. The controller for a hybrid vehicle according to claim 1, wherein:
   the supercharger includes at least an electric supercharger; and
   the compressor rotation speed of the supercharger is a rotation speed of an electric compressor included in the electric supercharger.

5. The controller for a hybrid vehicle according to claim 1, wherein the upper-limit discharging electric power is configured to be determined based on a temperature and a state of charge value of the power storage device.

6. The controller for a hybrid vehicle according to claim 1, wherein the upper-limit discharging electric power is configured to be determined to decrease as a degree of deterioration of the power storage device increases.

7. The controller for a hybrid vehicle according to claim 1, wherein, when the upper-limit discharging electric power is limited to be less than a predetermined determination electric power value, the control unit is configured to control the compressor rotation speed such that the rate of increase of the compressor rotation speed of the supercharger at the time of performing downshift in the transmission increases as the upper-limit discharging electric power decreases.

8. A control method for a hybrid vehicle, the hybrid vehicle including an engine with a supercharger serving as a drive power source for travel, a rotary machine serving as a drive power source for travel, a power storage device configured to transmit and receive electric power to and from the rotary machine, and a transmission that is provided in a power transmission path between the engine and driving wheels and between the rotary machine and the driving wheels, the control method comprising:
   predicting whether necessary discharging electric power from the power storage device which is required to perform downshift in the transmission exceeds upper-limit discharging electric power of the power storage device when downshift in the transmission is performed in a hybrid vehicle travel mode; and
   controlling a compressor rotation speed such that a rate of increase of the compressor rotation speed of the supercharger at the time of performing downshift in the transmission increases as the upper-limit discharging electric power decreases when it is predicted that the necessary discharging electric power exceeds the upper-limit discharging electric power.

* * * * *